(12) United States Patent
Pyo et al.

(10) Patent No.: US 11,385,679 B2
(45) Date of Patent: Jul. 12, 2022

(54) DISPLAY DEVICE

(71) Applicant: LG ELECTRONICS INC., Seoul (KR)

(72) Inventors: Jonggil Pyo, Seoul (KR); Taegon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/627,668

(22) PCT Filed: Jun. 30, 2017

(86) PCT No.: PCT/KR2017/006928
§ 371 (c)(1),
(2) Date: Dec. 30, 2019

(87) PCT Pub. No.: WO2019/004505
PCT Pub. Date: Jan. 3, 2019

(65) Prior Publication Data
US 2021/0157359 A1    May 27, 2021

(51) Int. Cl.
*G06F 1/16* (2006.01)
*H04N 5/655* (2006.01)

(52) U.S. Cl.
CPC ............ *G06F 1/1607* (2013.01); *H04N 5/655* (2013.01)

(58) Field of Classification Search
CPC .......................... G06F 1/1601; G06F 1/1607
See application file for complete search history.

(56) References Cited

U.S. PATENT DOCUMENTS 7,940,287 B2 * 5/2011 Kim .................. G02F 1/133308
345/905
8,687,138 B2 * 4/2014 Lee .......................... G09F 9/35
361/752

(Continued)

FOREIGN PATENT DOCUMENTS

KR    1020140060078    5/2014
KR    1020150069802    6/2015

(Continued)

OTHER PUBLICATIONS

PCT International Application No. PCT/KR2017/006928, International Search Report dated Mar. 23, 2018, 3 pages.

*Primary Examiner* — Adrian S Wilson
(74) *Attorney, Agent, or Firm* — Lee Hong Degerman Kang & Waimey

(57) ABSTRACT

A display device according to the present invention comprises: a display module curved in a forward-and-backward direction; a middle module curved to be coupled to a rear side of the display module; and a back module curved to be coupled to a rear side of the middle module, wherein the middle module comprises a plurality of coupling parts arranged spaced apart from each other along a curved direction of the middle module, the back module comprises a plurality of coupling counterparts, which are coupled to the plurality of coupling parts, respectively, and among the plurality of coupling parts and the plurality of coupling counterparts, one is a plurality of protrusion parts protruding in parallel with each other, and the other one is a plurality of hook parts which engage with the plurality of protrusion parts, respectively.

12 Claims, 20 Drawing Sheets

(56) References Cited

U.S. PATENT DOCUMENTS

| | | | |
|---|---|---|---|
| D806,663 S * | 1/2018 | Lee | D14/126 |
| 10,928,852 B2 * | 2/2021 | Xu | G06F 1/1607 |
| 2003/0043310 A1 * | 3/2003 | Cho | G02F 1/133308 349/58 |
| 2003/0234895 A1 * | 12/2003 | Sugawara | G02F 1/133308 349/58 |
| 2004/0183957 A1 * | 9/2004 | Han | G02F 1/133308 349/58 |
| 2014/0125913 A1 * | 5/2014 | Lee | G02B 6/0093 349/58 |
| 2016/0353593 A1 * | 12/2016 | Park | F16M 11/16 |

FOREIGN PATENT DOCUMENTS

| | | |
|---|---|---|
| KR | 1020150092066 | 8/2015 |
| KR | 1020150112449 | 10/2015 |
| KR | 1020160139832 | 12/2016 |

\* cited by examiner

DISPLAY DEVICE

CROSS-REFERENCE TO RELATED APPLICATIONS

This application is the National Stage filing under 35 U.S.C. 371 of International Application No. PCT/KR2017/006928, filed on Jun. 30, 2017, the contents of which are hereby incorporated by reference herein in its entirety.

TECHNICAL FIELD

The present invention relates to an assembly structure of a display apparatus.

BACKGROUND ART

There are various forms of display panels that implement images. For example, there are various display panels such as a liquid crystal display panel (LCD), a plasma display panel (PDP), an electro luminescent display (ELD), a vacuum fluorescent display (VFD), and an organic light emitting diode display panel.

In addition, a display apparatus equipped with a screen having a curvature has been developed. For example, a display apparatus that implements an OLED display panel having a flexible characteristic in a curved shape is known.

In addition, a technology which has a middle cover coupled to the rear side of the display panel and a back cover coupled to the rear side of the middle cover to form an inner space together with the middle cover is known.

DISCLOSURE

Technical Problem

A first object of the present invention is to simplify the coupling between the components of a display apparatus.

A second object of the present invention is to accurately implement the curvature of a curved display apparatus.

A third object of the present invention is to effectively secure the rigidity of a curved display apparatus.

In the prior art, the areas of the rear surface of the curved middle cover face each other at different angles. Therefore, there is a problem that the process of engaging the protrusion structure formed in any one of the middle cover and the back cover with the recessed structure formed in the other is inconvenient. For example, when protrusions respectively protrude perpendicularly to each area of the rearward face of the middle cover, the protrusion portions Protrude in different directions. Therefore, inconvenience occurs in that the protrusions are simultaneously inserted into each of the recessed structures or there is a problem in that the possibility of breakage of a coupling structure increases. A fourth object of the present invention is to solve such a problem.

In addition, in order to couple the curved middle cover and the back cover in the prior art, when relying only on screw fastening, not on hook fastening, there is a problem that the time and cost required in the process increases. A fifth object of the present invention is to solve such a problem and simplify the process of a display apparatus.

Technical Solution

In an aspect, there is provided a display apparatus including: a display module curved in a front and rear direction, a middle module curved to couple to a rear side of the display module, and a back module curved to couple to a rear side of the middle module. The middle module includes a plurality of coupling portions spaced apart from each other along a bending direction of the middle module, and the back module includes a plurality of coupling counterpart portions coupled to the plurality of coupling portions respectively. One of the plurality of coupling portions and the plurality of coupling counterpart portions is a plurality of protrusion portions protruded in parallel with each other, and the other is a plurality of coupling portions to which the plurality of protrusion portions are locked respectively.

The plurality of protrusion portions are protruded along the front and rear direction.

Each of the plurality of protrusion portions includes an insertion portion inserted into each of corresponding plurality of locking portions, and each of the plurality of locking portions includes a accommodation portion recessed in a shape that engages a corresponding insertion portion.

The accommodation portion of the plurality of locking portions is recessed in a direction parallel to each other.

The insertion portion includes a hook portion protruded in a direction crossing a protrusion direction of the protrusion portion. The locking portion includes a hook locking portion to which the hook portion is locked and seated.

The plurality of coupling portions are the plurality of protrusion portions, and the plurality of coupling counterpart portions are the plurality of locking portions.

The plurality of coupling portions are disposed in a rear surface of the middle module.

The rear surface includes a plurality of parallel portions in which the plurality of coupling portions are disposed respectively and disposed in parallel with each other.

The plurality of coupling portions are the plurality of protrusion portions disposed in a rear surface of the middle module. The plurality of protrusion portions include a plurality of starting ends fixed to the rear surface, and a plurality of finishing ends extended in parallel with each other to a rear side from the plurality of starting ends.

The middle module includes a middle cover coupled to a rear side of the display module, and a reinforcement portion which is coupled to a rear side of the middle cover, and extended along a direction in which the middle cover is curved. The plurality of coupling portions are disposed in the reinforcement portion.

The plurality of coupling portions are disposed along an extending direction of the reinforcement portion.

The plurality of coupling portions are disposed on a rear surface of the reinforcement portion. The rear surface includes a plurality of parallel portions in which the plurality of coupling portions are disposed respectively and disposed in parallel with each other.

The rear surface is formed to be stepped in a front rear direction in at least one end of the parallel portion.

The plurality of coupling portions are the plurality of protrusion portions disposed on a rear surface of the reinforcement portion.

The plurality of protrusion portions include a plurality of starting ends fixed to the rear surface, and a plurality of finishing ends extended in parallel with each other to a rear side from the plurality of starting ends.

In another aspect, there is provided a display apparatus including: a display module curved in a front and rear direction, a middle module curved to couple to a rear side of the display module, and a back module curved to couple to a rear side of the middle module. Any one of the middle module and the back module includes a plurality of protrusion portions which are spaced apart from each other along a curved direction and protruded in parallel with each other. The other of the middle module and the back module includes a plurality of locking portions to which the plurality of protrusion portions are locked respectively.

In another aspect, there is provided a display apparatus including: a display module curved in a front and rear direction, a middle cover curved to couple to a rear side of the display module, and a back cover curved to couple to a rear side of the middle cover, a reinforcement portion which is coupled to the rear side of the middle cover and extended along a bending direction of the middle cover, a plurality of coupling portions which are disposed in the reinforcement portion and spaced apart from each other along an extension direction of the reinforcement portion, and a plurality of coupling counterpart portions which are disposed in the back cover and respectively coupled to the plurality of coupling portions. One of the plurality of coupling portions and the plurality of coupling counterpart portions is a plurality of protrusion portions protruded in parallel with each other, and the other is a plurality of locking portions to which the plurality of protrusion portions are locked respectively.

Advantageous Effects

A coupling process between the middle module and the back module becomes very simple. In particular, the hook coupling can be used to easily couple the two components having a curved shape.

In addition, since the middle module and the back module can be easily disassembled and assembled, it is also advantageous when providing a repair service for a product, or the like.

In addition, since the plurality of protrusion portions protrude in parallel with each other, when the curved middle module and the back module are coupled, the coupling is completed by moving the two components in one direction without changing the curvature of each component, thereby simplifying the coupling process and reducing the possibility of deformation or breakage of component.

In addition, the reinforcement portion makes it possible to easily maintain the curvature of the display apparatus, and effectively secure the rigidity.

In addition, the plurality of coupling portions are disposed in the rear surface of the reinforcement portion, so that the middle module and the back module can be stably coupled, and the reinforcement portion can reinforce not only the middle module but also the rigidity of the back module.

In addition, by providing the parallel portion, there is an effect of minimizing the bending stress received by the plurality of coupling portions that are parallel to each other during the coupling process. This is because the protrusion directions of the parallel portion and the plurality of coupling portions are perpendicular to each other, when the middle module and the back module are coupled, the parallel portion supporting the coupling portion are disposed vertically with respect to the direction in which the plurality of coupling portions are pressurized.

DESCRIPTION OF DRAWINGS

FIG. 10A is a perspective view of the protrusion portion P100, FIG. 10B is an elevation view of one side of the protrusion portion P100, and FIG. 10C is an elevation view of other side of the protrusion portion P100.

FIG. 10A is a perspective view of the protrusion portion P200, FIG. 10B is an elevation view of one side of the protrusion portion P200, and FIG. 10C is an elevation view of other side of the protrusion portion P200.

FIG. 13A is a perspective view of the locking portion C100, and FIG. 13B is an elevation view of one side of the locking portion C100.

MODE FOR INVENTION

The present invention can be described based on a spatial orthogonal coordinate system by X, Y and Z axes that are orthogonal to each other shown in the figures. Each axis direction (X-axis direction, Y-axis direction, Z-axis direction) means both directions in which each axis extends. The denotation of + sign (+X-axis direction, +Y-axis direction, +Z-axis direction) in front of each axis direction means the positive direction which is one direction of both directions in which each axis extends. The denotation of – sign in front of each axis direction means the negative direction which is the other direction of both directions in which each axis extends.

The directions of "front/rear/left/right/up/down" mentioned below may be understood as "+X-axis/–X-axis/+Y-axis/–Y-axis/+Z-axis/–Z-axis" directions, respectively. However, this is only a criterion for explaining the present invention so that the present invention can be clearly understood, and each direction may be defined differently according to a given criterion.

A display apparatus 1 according to an embodiment of the present invention forms a two-dimensional curvature that is curved along the circumference of the Z axis, but as another example, a display apparatus that forms a two-dimensional curvature that is curved along the circumference of the Y axis may be implemented, and a display apparatus that forms a three-dimensional curvature that is curved along the circumference of the Z axis and the Y axis.

The use of the terms 'first, second', etc. in front of the components mentioned below is only to avoid confusion of the referred components, and is not related to the order, importance or master-servant relationship between the components. For example, an invention including only a second component without a first component can be implemented.

Figure 1:
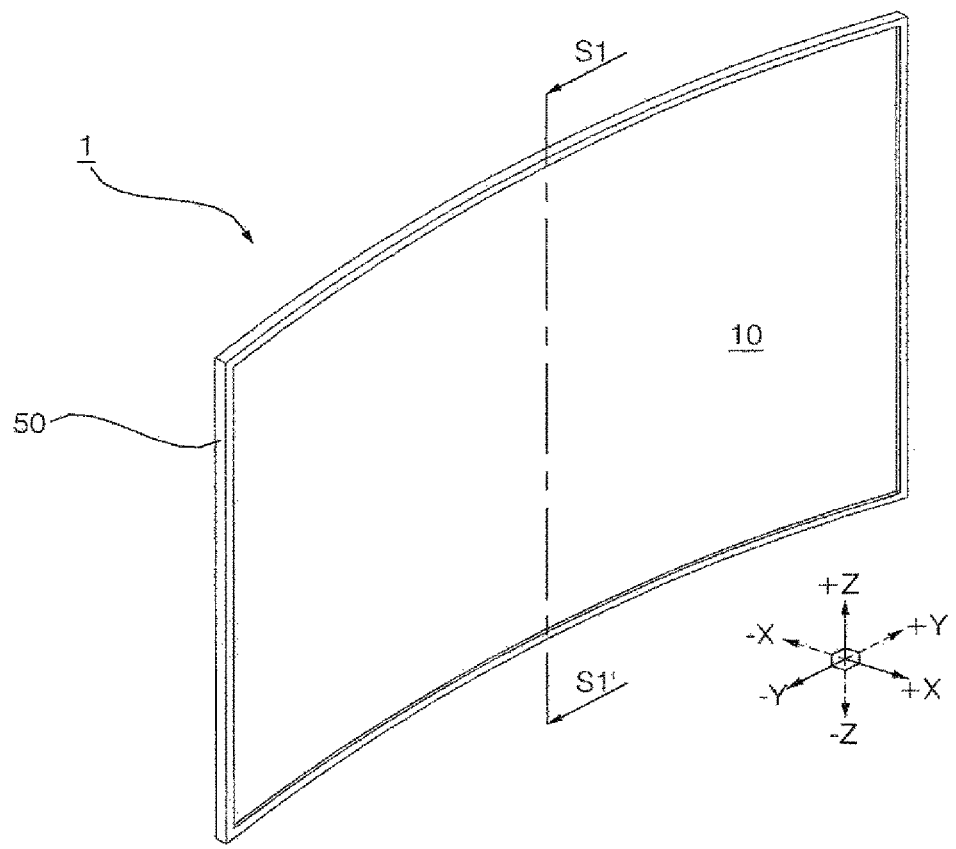
FIG. 1 is a perspective view of a curved display apparatus 1 according to an embodiment of the present invention.

The present invention is applicable to any apparatus, such as a portable terminal device such as a smart phone, a notebook computer, a tablet PC, a monitor, and a TV, that can output an image. FIG. 1 shows a TV according to an embodiment of the present invention, but the present invention is not limited thereto.

FIGS. 1 to 5, the display apparatus 1 according to an embodiment of the present invention includes a display module 10 for outputting an image. The display apparatus 1 includes a middle module 50 coupled to the rear side of the display module 10. The display apparatus 1 includes a back module 80 coupled to the rear side of the middle module 50. An internal space is formed between the middle module 50 and the back module 80. The display apparatus 1 includes a control component 70 disposed in the internal space.

In addition, the display module 10 includes a display panel 11 which is disposed in the front side and outputs an image. The display module 10 may include a support member 15 which is coupled to the rear side of the display panel 11 and supports the display panel 11. The display module 10 may include an attachment member 13 which is disposed between the display panel 11 and the support member 15 and fixes the display panel 11 to the support member 15.

In addition, the middle module 50 includes a middle cover 51 coupled to the rear side of the display module 10. The middle module 50 may include a reinforcement portion 53 coupled to the rear side of the middle cover 51. The middle module 50 includes a coupling portion 57 that is coupled to the back module 80. A plurality of coupling portions 57 are provided. The middle module 50 may further include an auxiliary coupling portion 59 coupled to the back module 80 in addition to the plurality of coupling portions 57. A plurality of auxiliary coupling portions 59 may be provided.

In addition, the back module 80 also includes a back cover 81 forming a rear side surface. The back module 80 includes a coupling counterpart portion 87 coupled to the coupling portion 57. The plurality of coupling counterpart portions 87 are coupled to the plurality of coupling portions 57, respectively. The back module 80 includes an auxiliary coupling counterpart portion 87 coupled to an auxiliary coupling portion 59. A plurality of auxiliary coupling counterpart portions 89 are coupled to the plurality of auxiliary coupling portions 59, respectively.

One of the coupling portion 57 and the coupling counterpart portion 87 is a protrusion portion P described later, and the other is a coupling portion C described later. One of the plurality of coupling portions 57 and the plurality of coupling counterpart portions 87 is a plurality of protrusion portions P and the other is a plurality of locking portions C. The plurality of protrusion portions P are protruded in parallel with each other. Distal ends of the plurality of protrusion portions P protrude in parallel with each other. Finishing ends of the plurality of protrusion portions P protrude in parallel with each other. The plurality of protrusion portions P may be locked in the plurality of locking portions C, respectively.

The display apparatus 1 includes a controller (not shown) for controlling image output of the display panel 11. The display apparatus 1 may include a speaker (not shown) for outputting sound. The controller controls the image output of the display module 10. The controller may control sound output of the speaker. The display apparatus 1 may include a cable (not shown) for transmitting a control signal of the controller to the display panel 11.

Figure 2:
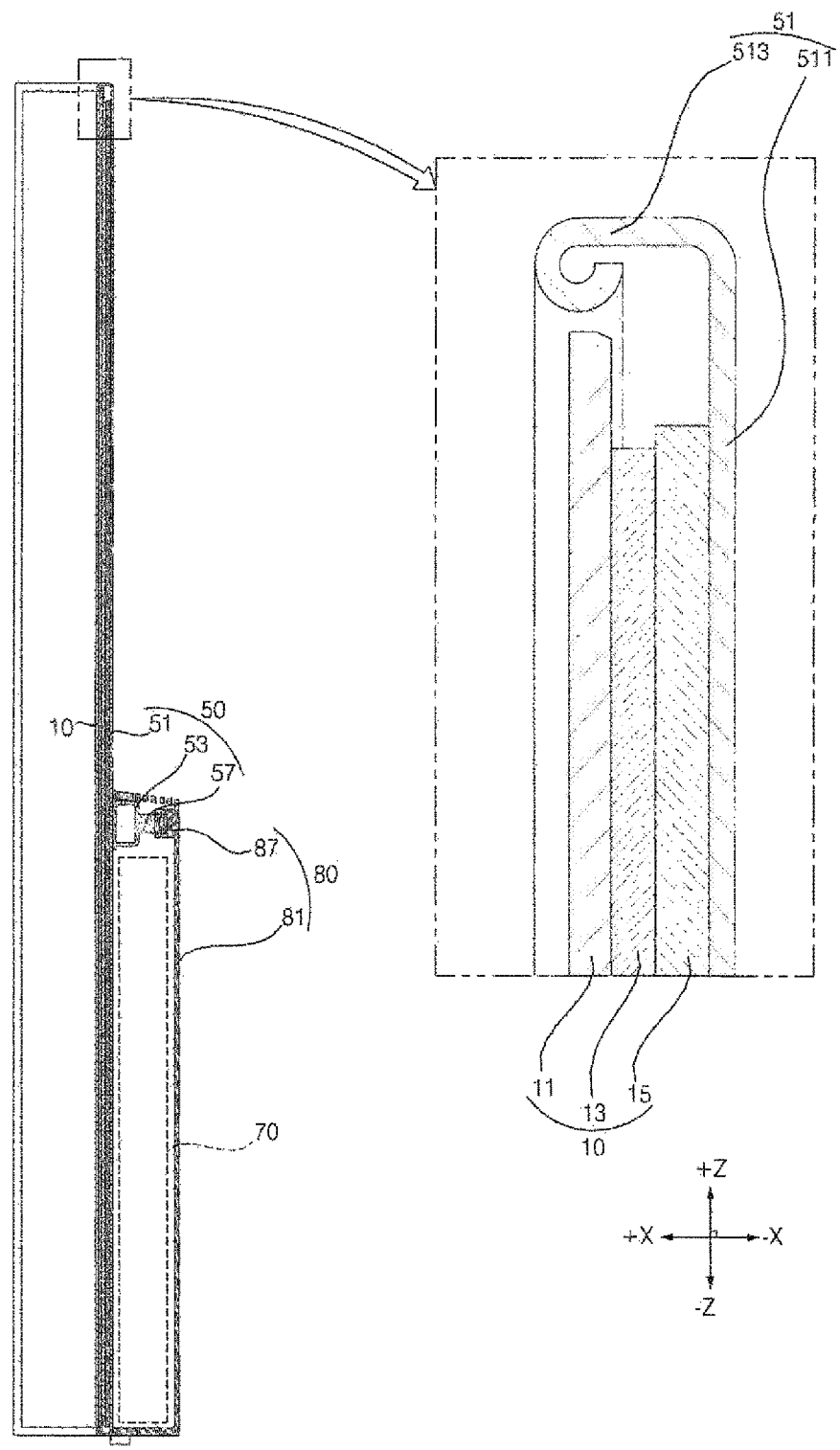
FIG. 2 is a cross-sectional view of the display apparatus 1 of FIG. 1 vertically cut along the line S1-S1'.
Figure 3:
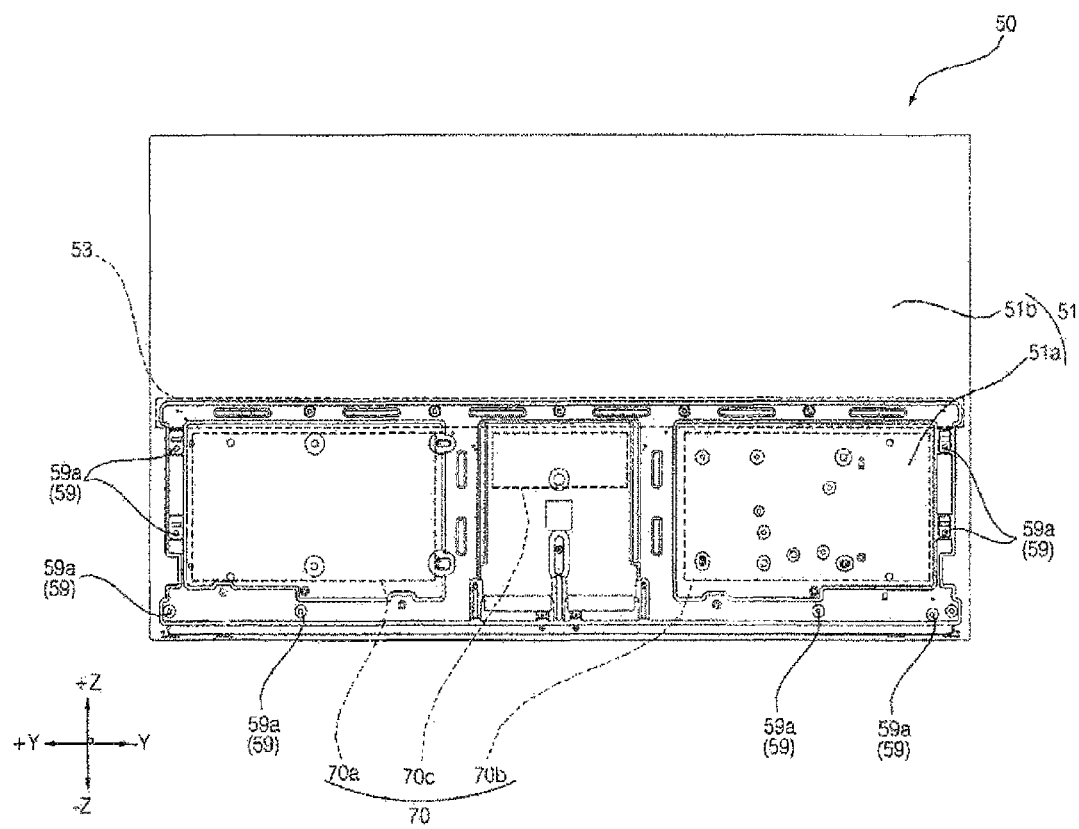
FIG. 3 is an elevation view of a rear side surface of a middle module 50 of FIG. 2.
Figure 4:
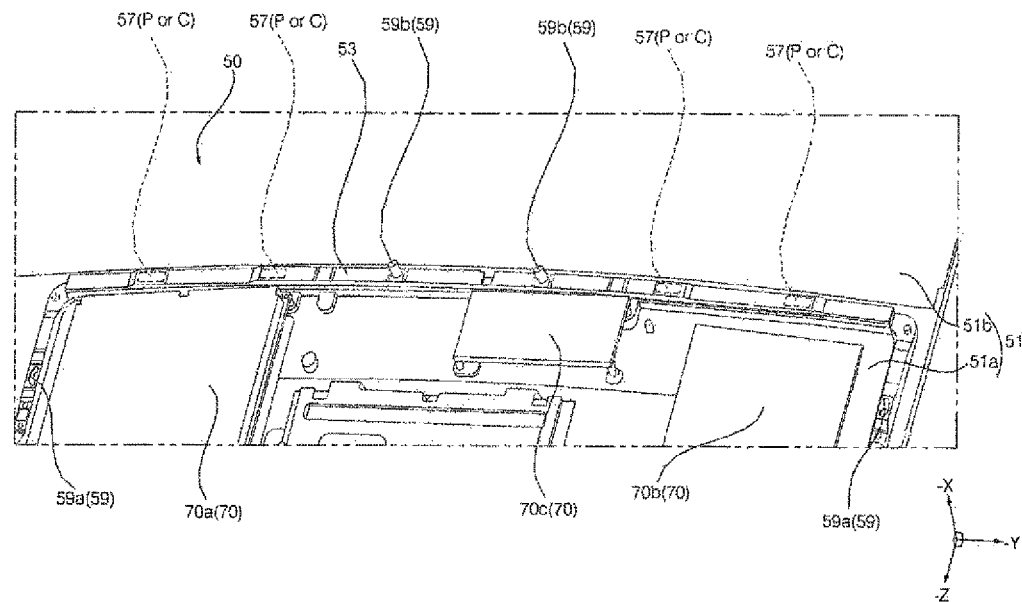
FIG. 4 is a perspective view illustrating a portion of the rear side surface of the middle module 50 of FIG. 3.

Referring to FIGS. 2 to 4, the controller includes the control component 70. At least portion of the control component 70 is disposed in an internal space between the middle module 50 and the back module 80. The control component 70 may include a power supply part 70a for distributing power to each component. The power supply part 70a may supply power to the display panel 11. The power supply part 70a may receive and store external power. The control component 70 includes a main circuit board 70b for processing a control signal. The control component 70 may further include a control board 70c for controlling the image output.

The control component 70 may be disposed in the middle module 50. The control component 70 may be fixed to the rear surface of the middle module 50. The control component 70 may be fixed to an inner surface portion 51a of the middle module 50. FIG. 3 exemplarily shows a disposition area of the power supply part 70a, a main circuit board 70b, and a control board 70c. In the present embodiment, the power supply part 70a is disposed in the left side of the inner surface portion 51a, the main circuit board 70b is disposed in the right side of the inner surface portion 51a, and the control board 70c is disposed between the power supply part 70a and the main circuit board 70b.

An interface PCB (not shown) and at least one source PCB (not shown) may be positioned in at least a portion of the rear surface of the display panel 11. At least one source PCB may be connected to the interface PCB. A plurality of source PCBs may be provided. The plurality of source PCBs may be spaced apart from each other. In the interface PCB, signal wires for transmitting digital video data and a timing control signal transmitted from the control board 70c may be disposed. The source PCB may apply a voltage to the display panel 11 according to a signal transmitted from the interface PCB. The source PCB may apply a driving waveform to the display panel 11 according to an image signal. The source PCB may be connected to the display panel 11 by a source Chip On Flexible Printed Circuit (COF) (not shown). In the lower end of the display panel 11, the source COF connected to one side of the source PCB may be connected to the display panel 11. The source COF may be electrically connected to the source PCB and the TFT of the display panel 11. A data integrated circuit may be mounted in the source COF.

Referring to FIGS. 1 and 2, the display module 10 is formed in a plate shape. The display module 10 may be formed in a rectangular shape when viewed from the front. The display module 10 is disposed in front of the middle module 50. The display module 10 is supported by the middle module 50. The edge of the middle module 50 may cover the edge of the display module 10.

The display module 10 has a shape curved in the front-rear direction. The display module 10 is formed in a shape curved in the X-axis direction. The display module 10 is formed in a curved shape in at least one cross section (e.g., an XY cross section) parallel to the front-rear direction. The front surface of the display module 10 forms a curvature. The front surface of the display module 10 may form a curvature recessed to the rear side. The rear surface of the display module 10 may form a curvature protruded to the rear side.

Although not shown, the display module according to another example may be formed in a curved shape in the XZ cross section, or may be formed in a curved shape in both the XY cross section and the XZ cross section. Hereinafter, the display module 10 will be described based on the curved shape on the XY cross section, but is not limited thereto.

The direction in which the display module 10 is curved and extended may be referred to as a "curve direction". When the display module 10 is viewed from the X-axis direction, the curve direction is seen as a straight line, but when the display module 10 is viewed from the Z-axis direction, the curve direction is seen as a curve. When the display module 10 is viewed from the X axis direction, the curve direction is extended in the Y axis direction.

The display panel 11 is formed to be curved in the front-rear direction. The display panel 11 is extended in the curve direction. When the display panel 11 is viewed from the front, any one of the lateral length and the vertical length may be longer than the other. The display panel 11 may be formed in a rectangular shape having four sides when viewed from the front. When viewed from the front, the display panel 11 is formed in a rectangular shape having two opposite sides extended in the curve direction and two opposite sides extended perpendicular to the curve direction. When viewed from the front, the display panel 11 may be formed in a rectangular shape having two long sides parallel to the Y axis and two short sides parallel to the Z axis.

The display panel 11 may be a plasma display panel (PDP), a field emission display (FED), a liquid crystal display (LCD) panel, and an organic light emitting diode (OLED) display panel. Hereinafter, it will be described based on the OLED display panel 11, but is not necessarily limited thereto.

The OLED display panel 11 may include an upper cover layer (not shown), an upper electrode (not shown), an organic light emitting layer (not shown), a lower electrode (not shown), and a lower cover layer (not shown). The upper cover layer, the upper electrode, the organic light emitting layer, the lower electrode, and the lower cover layer may be sequentially disposed from the front side to the rear side.

The upper cover layer and the upper electrode may include a transparent material. The upper cover layer may be made of a glass material having a thickness of 0.7 mm. The upper cover layer may be made of a transparent thin film. The upper electrode may be a cathode, and the lower electrode may be an anode. The lower electrode may include a material that is not transparent. However, it is not limited thereto, and the lower electrode may include a transparent material (e.g., ITO). In this case, light may be emitted to one surface of the lower electrode. When voltage is applied to the upper and lower electrodes, a light emitted from the organic light emitting layer may pass through the upper electrode and the upper cover layer and be irradiated to the outside. The OLED display panel 11 may include a light blocking plate (not shown) disposed in the rear side of the lower electrode. An electron transfer layer (ETL) (not shown) may be disposed between the organic light emitting layer and the upper electrode which is a cathode. A hole transfer layer (ETL) (not shown) may be disposed between the organic light emitting layer and the lower electrode which is an anode. The lower cover layer may be made of an invar material having a thickness of 0.1 mm. A thin film transistor (TFT) (not shown) may be disposed between the lower electrode and the lower cover layer.

Referring to FIG. 2, the support member 15 supports the display panel 11. The support member 15 is disposed in the rear side of the display panel 11. The support member 15 covers the rear side of the display panel 11. The support member 15 is disposed between the display panel 11 and the middle module 50. The support member 15 is formed in a plate shape. The support member 15 may be formed of a metal material. The support member 15 is formed in a shape curved in the front-rear direction (X-axis direction). The support member 15 forms a curvature corresponding to the curvature of the display panel 11. The support member 15 is extended along the curve direction.

The support member 15 may be coupled to the display panel 11 by the attachment member 13. The attachment member 13 is disposed between the display panel 11 and the support member 15. The display panel 11, the attachment member 13, and the support member 15 may be disposed in contact with each other sequentially from the front side to the rear side. The attachment member 13 may be formed in a sheet shape. The attachment member 13 may be a member having a double-sided adhesive force. The attachment member 13 is formed in a shape curved along the support member 15. The attachment member 13 is formed in the shape curved in the front-rear direction. The attachment member 13 may be extended along the curve direction.

Referring to FIGS. 1 to 4, the middle module 50 is curved to be coupled to the rear side of the display module 10. The middle module 50 is curved in the front-rear direction. The middle module 50 forms a curvature corresponding to the curvature of the display module 10. The front surface of the middle module 50 may form a curvature recessed to the rear side. The rear surface of the middle module 50 may form a curvature protruded to the rear side. The middle module 50 is curved in the XY cross section. The middle module 50 is extended along the curve direction. The middle module 50 forms curvature in the Y-axis direction.

The middle module 50 includes a middle cover 51 that is curved to be coupled to the rear side of the display module 10. The middle cover 51 is curved in the front-rear direction. The middle cover 51 forms a curvature corresponding to the curvature of the display module 10. The front surface of the middle cover 51 may form a curvature recessed to the rear side. The rear surface of the middle cover 51 may form a curvature protruded to the rear side. The middle cover 51 is curved in the XY cross section. The middle cover 51 is extended along the curve direction. The middle cover 51 forms curvature in the Y-axis direction. The middle cover 51 is curved along the circumference of the Z axis.

The middle cover 51 may support the rear surface of the display panel 11. The middle cover 51 covers the rear surface of the display panel 11. The middle cover 51 may support the edge of the display module 10. The middle cover 51 covers the edge end of the display module 10.

The middle cover 51 includes a rear portion 511 covering the rear side surface of the display module 10. The middle cover 51 includes a side portion 513 that covers the edge end of the display module 10. The side portion 513 is extended along the edge of the display module 10. The side portion 513 is extended along the edge of the rear portion 511. The side portion 513 is curved and extended forward from the edge of the rear portion 511.

The middle cover 51 forms a rear surface. The rear portion 511 forms the rear surface of the middle cover 51. At least a portion of the rear surface of the middle cover 51 faces the back module 80 in the front-rear direction. At least a portion of the rear surface of the middle cover 51 may be exposed to the outside.

The middle cover 51 includes an inner surface portion 51a which forms an inner space together with the back module 80. In the present embodiment, the inner surface portion 51a is disposed in the lower side of the rear surface of the middle cover 51. The middle cover 51 includes an outer surface portion 51b that forms an outer surface while being coupled to the back module 80. In the present embodiment, the outer surface portion 51b is disposed in the upper side of the rear surface of the middle cover 51. The control component 70 is disposed in the inner surface portion 51a.

The middle module 50 includes a plurality of coupling portions 57 spaced apart from each other along the bending direction of the middle module 50. A plurality of coupling portions 57 are disposed along the curve direction. The plurality of coupling portions 57 are disposed along the surface on which the curvature of the middle module 50 is formed. The plurality of coupling portions 57 are disposed along the Y-axis direction when viewed from the rear side.

The plurality of coupling portions 57 are disposed in the rear surface of the middle module 50. The plurality of coupling portions 57 are disposed in a portion facing the back module 80, among the rear surface of the middle module 50. The plurality of coupling portions 57 may be disposed in the rear surface of the reinforcement portion 53 of the middle module 50. The plurality of coupling portions 57 may be disposed in the inner surface portion 51a of the middle module 50.

The plurality of coupling portions 57 may be symmetrically disposed based on the Z axis. The plurality of coupling portions 57 may be disposed to be bilaterally symmetric in the direction in which the curvature is formed (Y-axis direction). In the present embodiment, the plurality of coupling portions 57 are disposed to be bilaterally symmetric in the direction.

The coupling portion 57 is any one of the protrusion portion P and the locking portion C. The plurality of coupling portions 57 is any one of the plurality of protrusion portions P and the locking portion C. For example, the coupling portion 57 may be the protrusion portion P, and the coupling counterpart portion 87 may be the locking portion C. In another example, the coupling portion 57 may be the coupling portion C and the coupling counterpart portion 87 may be the protrusion portion P.

The middle module 50 may further include an auxiliary coupling portion 59 coupled to the back module 80 in addition to the plurality of coupling portions 57. The auxiliary coupling portion 59 may be coupled to the auxiliary coupling counterpart portion 89 of the back module 80. A plurality of auxiliary coupling portions 59 may be provided. The plurality of auxiliary coupling portions 59 are coupled respectively to corresponding plurality of auxiliary coupling counterpart portions 89. The auxiliary coupling portion 59 reinforces the coupling force of the middle module 50 and the back module 80.

For example, the auxiliary coupling portion 59 may form a fastening hole into which a fastening member such as a screw is inserted. The auxiliary coupling portion 59 may form a fastening hole and may be formed to protrude to the rear side. As another example, the auxiliary coupling portion 59 may form a hook, or the like.

The auxiliary coupling portion 59 may include a first auxiliary coupling portion 59a disposed in the middle cover 51. A plurality of first auxiliary coupling portions 59a may be provided. Some of the plurality of first auxiliary coupling portions 59a may be disposed to be spaced apart from each other along the Z axis. Some of the plurality of first auxiliary coupling portions 59a may be disposed in the lower side of the middle cover 51. The auxiliary coupling portion 59 may be coupled to the first auxiliary coupling counterpart portion 89a of the back module 80.

The auxiliary coupling portion 59 may include a second auxiliary coupling portion 59b disposed in the reinforcement portion 53. A plurality of second auxiliary coupling portions 59b may be provided. The plurality of second auxiliary coupling portions 59b may be disposed to be spaced apart from each other along the extending direction of the reinforcement portion 53. The second auxiliary coupling portion 59b may be disposed in the central portion of the reinforcement portion 53. A pair of second auxiliary coupling portions 59b may be symmetrically disposed about the Z axis.

The second auxiliary coupling portion 59b may protrude in parallel with the plurality of protrusion portions P. The second auxiliary coupling portion 59b protrudes in the X-axis direction. The plurality of second auxiliary coupling portions 59b protrude in parallel with each other. The second auxiliary coupling portion 59b may form a fastening hole into which a fastening member such as a screw is inserted into the protruding end.

Figure 5:
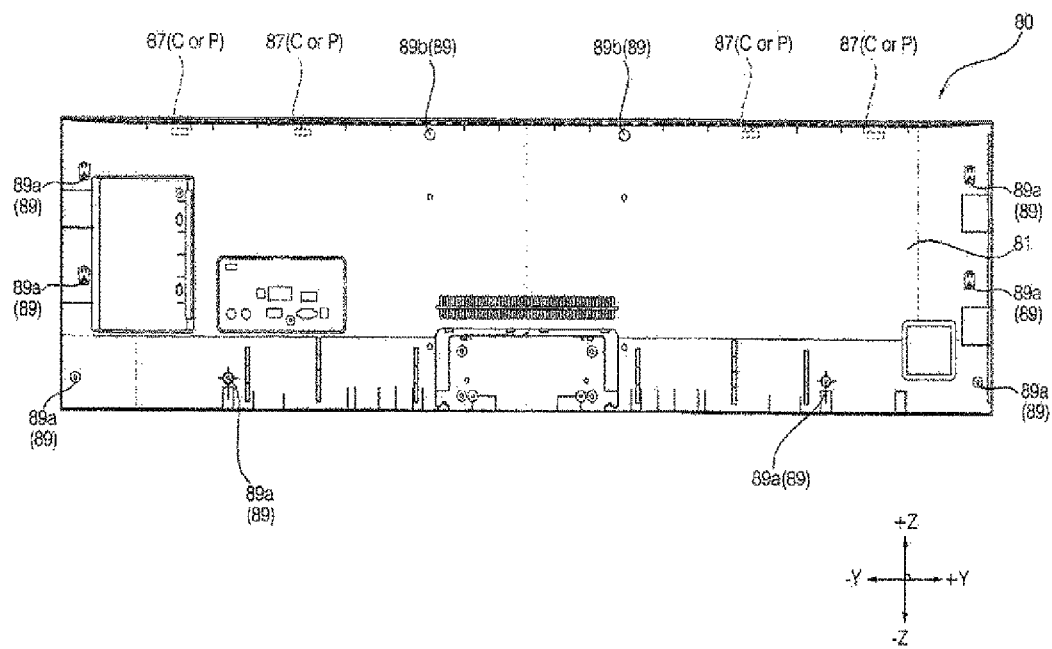
FIG. 5 is an elevation view of a front surface of a back module 80 of FIG. 2.

Referring to FIGS. 2 and 5, the back module 80 is curved to couple to the rear side of the middle module 50. The back module 80 is curved in the front-rear direction. The back module 80 forms a curvature corresponding to the curvature of the middle module 50. The front surface of the back module 80 may form a curvature recessed to the rear side. The rear surface of the back module 80 may form a curvature protruded rearwardly. The back module 80 is curved in the XY cross section. The back module 80 is extended along the curve direction. The back module 80 forms curvature in the Y-axis direction.

The back module 80 forms an internal space in which the control component 70 is accommodated, together with the middle module 50. The back module 80 is disposed in an area corresponding to the inner surface portion 51a of the middle module 50. The inner surface of the back module 80 and the inner surface portion 51a of the middle module 50 partitions the internal space. The central portion of the front surface of the back module 80 is recessed to the rear side to form the internal space. The edge portion of the back module 80 is formed in a shape that protrudes relatively forward in comparison with the center portion of the back module 80. The front end portion of the edge of the back module 80 may contact the middle module 50.

The back module 80 includes a back cover 81 that is curved to couple to the rear side of the middle module 50. The back cover 81 is curved to couple to the rear side of the middle cover 51. The back cover 81 is disposed in an area corresponding to the inner surface portion 51a of the middle module 50. The back cover 81, together with the middle cover 81, forms an inner space in which the control component 70 is accommodated. The inner surface of the back cover 81 and the inner surface portion 51a of the middle module 50 define an inner space. The central portion of the front surface of the back cover 81 is recessed to the rear side to form the inner space. The edge portion of the back cover 81 is formed in a shape that protrudes relatively forward in comparison with the center portion of the back cover 81. The front end of the edge of the back cover 81 may be in contact with the middle module 50.

The back cover 81 may be supported by the rear surface of the middle module 50. The back cover 81 covers at least portion of the rear surface of the middle module 50. The back cover 81 covers the lower area of the rear surface of the middle module 50.

A plurality of ventilation holes (not shown) may be formed in the back cover 81. Heat generated from the control component 70 in the internal space may be transferred to the air, and heated air may be discharged to the outside through the ventilation hole.

The back module 80 includes a plurality of coupling counterpart portions 87 disposed to be spaced apart from each other along the bending direction of the back module 80. A plurality of coupling counterpart portions 87 are disposed along the curve direction. The plurality of coupling counterpart portions 87 are disposed along a surface on which the curvature of the back module 80 is formed. The plurality of coupling counterpart portions 87 are disposed along the Y-axis direction when viewed from the front.

The plurality of coupling counterpart portions 87 are coupled to the plurality of coupling portions 57, respectively. The coupling counterpart portion 87 is shaped to engage with the coupling portion 57. The coupling counterpart portion 87 and the coupling unit may be hooked to each other.

The plurality of coupling counterpart portions 87 are disposed in the front surface of the back module 80. The plurality of coupling counterpart portions 87 are disposed in the back cover 81. The plurality of coupling counterpart portions 87 are disposed in a portion, among the front surface of the back module 80, that faces the plurality of coupling portions 57. The plurality of coupling counterpart portions 87 may be disposed to face the reinforcement portion 53 in the X-axis direction. The plurality of coupling counterpart portions 87 may be disposed in the inner surface of the back module 80.

The plurality of coupling counterpart portions 87 may be symmetrically disposed based on the Z axis. The plurality of coupling counterpart portions 87 may be disposed to be bilaterally symmetric in the direction (the Y-axis direction) in which the curvature is formed. In the present embodiment, the plurality of coupling counterpart portions 87 are disposed to be bilaterally symmetric.

The coupling portion 57 is any one of the protrusion portion P and the locking portion C, and the coupling counterpart portion 87 is the other of the protrusion portion P and the locking portion C. The plurality of coupling portions 57 are any one of the plurality of protrusion portions P and the locking portion C, and the plurality of coupling corresponding portions 87 are the other of the plurality of protrusion portions P and the locking portion C. The plurality of coupling portions 57 are a plurality of protrusion portions P, and the plurality of coupling counterpart portions 87 are preferably the locking portions C, but are not necessarily limited thereto.

The back module 80 may further include an auxiliary coupling counterpart portion 89 coupled to the middle module 50, in addition to the plurality of coupling counterpart portions 87. The auxiliary coupling counterpart portion 89 may be coupled to the auxiliary coupling portion 59 of the middle module 50. A plurality of auxiliary coupling counterpart portion 89 may be provided. The auxiliary coupling counterpart portion 89 reinforces the back module 80 and the coupling force of the back module 80.

For example, the auxiliary coupling counterpart portion 89 may form a fastening hole into which a fastening member such as a screw is inserted. The auxiliary coupling counterpart portion 89 may form a fastening hole and may be formed to protrude forward. As another example, the auxiliary coupling counterpart portion 89 may form a hook or the like.

The auxiliary coupling counterpart portion 89 may include a first auxiliary coupling counterpart portion 89a coupled to the first auxiliary coupling portion 59a. A plurality of first auxiliary coupling counterpart portions 89a may be provided. Some of the plurality of first auxiliary coupling counterpart portions 89a may be disposed to be spaced apart from each other along the Z axis. Some of the first auxiliary coupling counterpart portions 89a may be disposed in the lower side of the back cover 81.

The auxiliary coupling counterpart portion 89 may include a second auxiliary coupling counterpart portion 89b coupled to the second auxiliary coupling portion 59b. A plurality of second auxiliary coupling counterpart portions 89b may be provided. A pair of second auxiliary coupling counterpart portions 89b may be symmetrically disposed based on the Z axis. The second auxiliary coupling counterpart portion 89b may form a fastening hole through which a fastening member such as a screw passes.

Hereinafter, first to third embodiments of a coupling structure of the middle module 50 and the back module 80 will be described with reference to FIGS. 6 to 9. Referring to FIGS. 6 to 9, "(P)" after the reference numeral means that a corresponding configuration is a protrusion portion P, and "(C)" after the reference numeral means that a corresponding configuration is the locking portion C.

Figure 6:
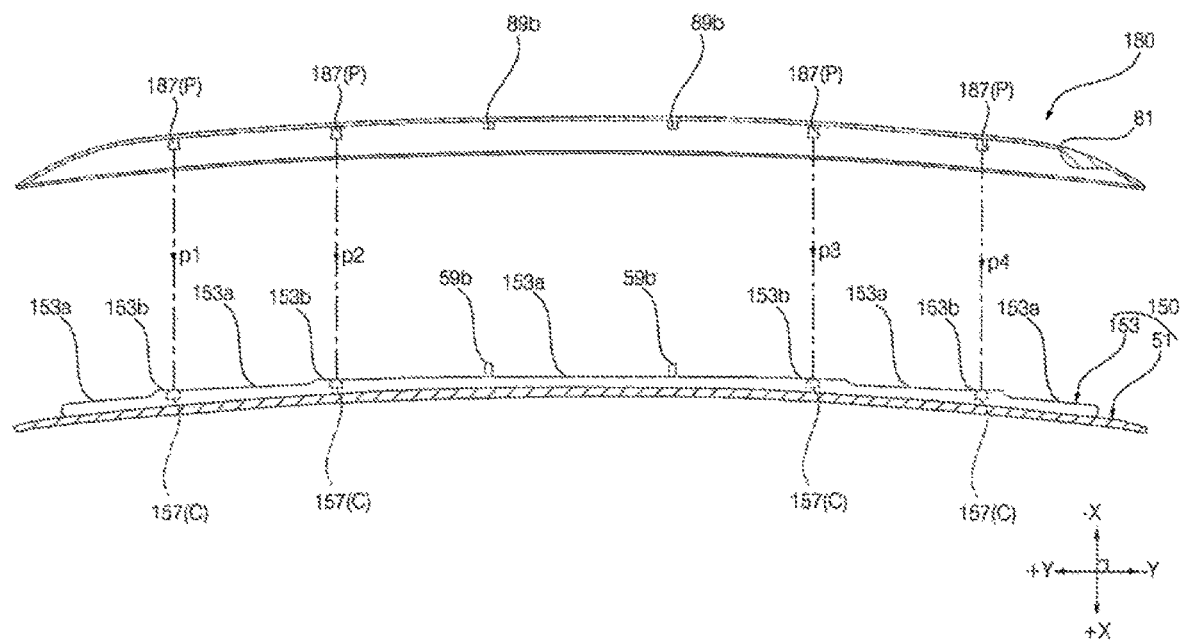
FIG. 6 is a bottom elevation view illustrating a coupling structure of a middle module 150 and a back module 180 according to a first embodiment.

In the first embodiment with reference to FIG. 6, the plurality of coupling portions 157 are a plurality of locking portions C, and the plurality of coupling counterpart portions 187 are a plurality of protrusion portions P. In the second and third embodiments with reference to FIGS. 7 and 9, a plurality of coupling portions 257, 357 are a plurality of protrusion portions P, and a plurality of coupling counterpart portions (287(C), 387(C)) are a plurality of locking portions C.

Figure 7:
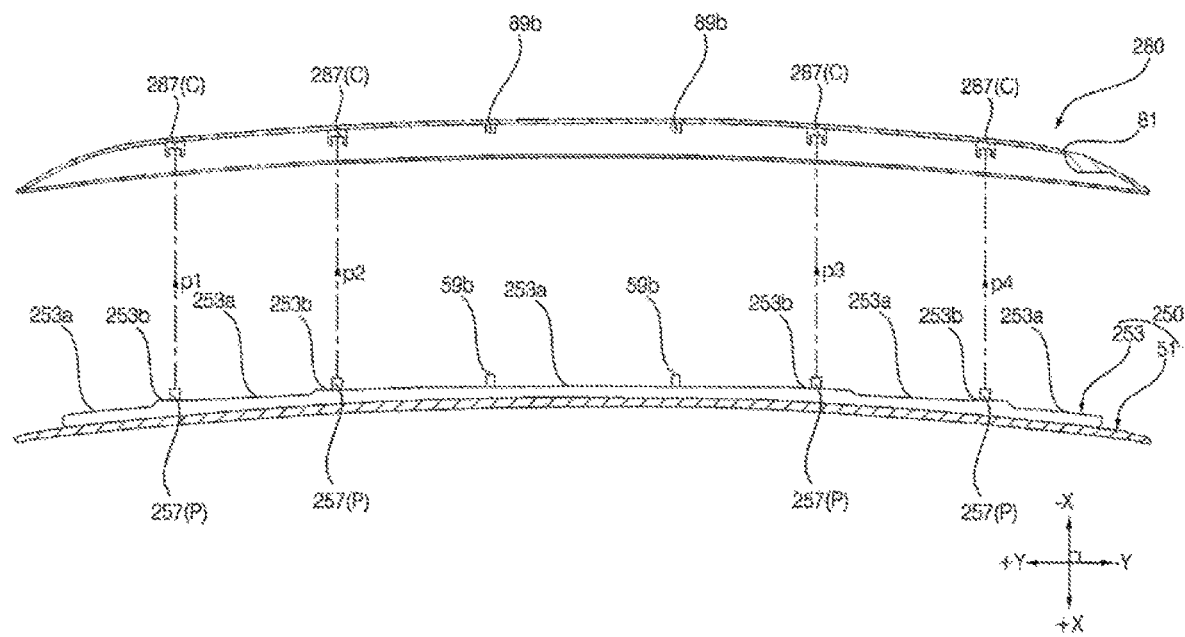
FIG. 7 is a bottom elevation view illustrating a coupling structure of a middle module 250 and a back module 280 according to a second embodiment.
Figure 8:
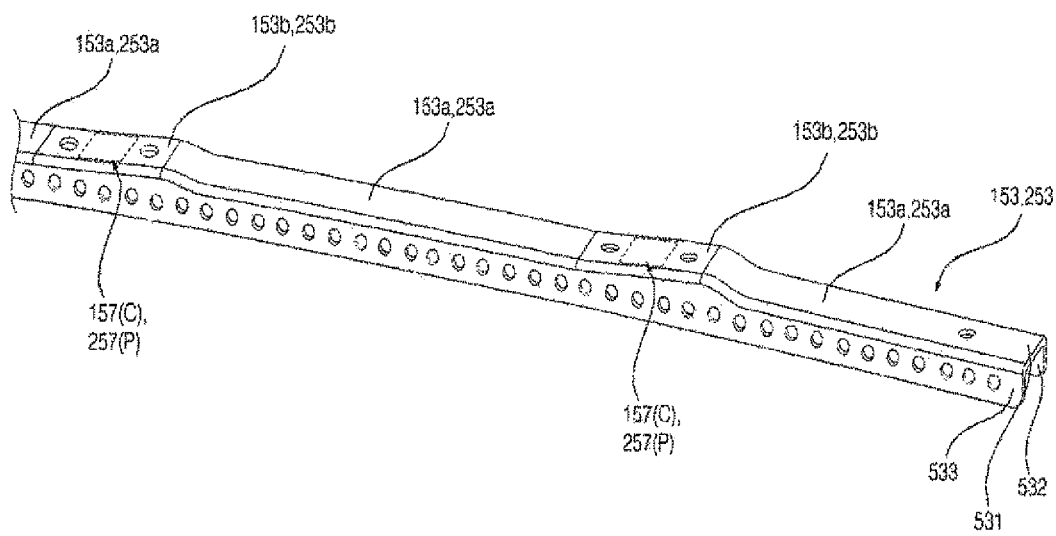
FIG. 8 is a partial perspective view of the reinforcement portions 153 and 253 of FIGS. 6 and 7.

Hereinafter, the first and second embodiments will be described with reference to FIGS. 6 to 8. The rear surface of the middle module 150, 250 includes a plurality of parallel portions 153b and 253b in which a plurality of coupling portions 157 and 257 are disposed, respectively. The plurality of parallel portions 153b and 253b are disposed in parallel with each other.

The plurality of parallel portions 153b and 253b form a surface facing the rear side. The plurality of parallel portions 153b and 253b form a surface perpendicular to the protruding direction of the plurality of protrusion portions P. In the present embodiment, the plurality of protrusion portions P protrude along the X-axis direction (the front and rear direction), and the plurality of parallel portions 153b and 253b form a surface perpendicular to the X-axis direction (the front and rear direction). The rear surfaces formed by the plurality of parallel portions 153b and 253b are disposed in parallel with each other. The plurality of parallel portions 153b and 253b are disposed to face the back modules 180 and 280.

The rear surface of the middle modules 150 and 250 includes an extension portion 153a, 253a which connects the plurality of parallel portions 153b and 253b to each other and is extended. The extension portion 153a, 253a may form a curvature. The extension portion 153a, 253a forms a curvature corresponding to the curvature of the middle module 150, 250. The extension portion 153a, 253a is extended along the curve direction.

The plurality of parallel portions 153b and 253b may be spaced apart from each other along the curve direction.

When viewed from the X-axis direction, the plurality of parallel portions 153b and 253b may be spaced apart from each other along the Y-axis direction. When viewed from the Z-axis direction, the plurality of parallel portions 153b and 253b may be spaced apart from each other, and the plurality of extension portions 153a and 253a may be spaced apart from each other. When viewed from the Z-axis direction, the plurality of parallel portions 153b and 253b and the plurality of extension portions 153a and 253a are alternately disposed along the curve direction.

The rear surface of the middle module 150, 250 may be stepped in at least one end of the parallel portions 153b and 253b in the front-rear direction. The rear surface of the middle module 150, 250 may be stepped in at least one of the edge ends of the parallel portions 153b and 253b in the front-rear direction.

Specifically, the middle module 150, 250 is extended along the curve direction as a whole and is curved as a whole, and some areas (a plurality of parallel portions 153b and 253b) of the rear surface in which the plurality of coupling portions 157 and 257 are disposed may be provided in parallel with each other. A step may be formed in a connection portion between the plurality of parallel portions 153b and 253b and a portion forming a curvature (extension portion 153a, 253a), among the rear surface of the middle modules 150 and 250, in the front-rear direction.

The parallel portion 153b, 253b may be formed in the reinforcement portion 153, 253. The parallel portion 153b, 253b and the extension portion 153a, 253a may be formed in the reinforcement portion 153, 253.

Figure 9:
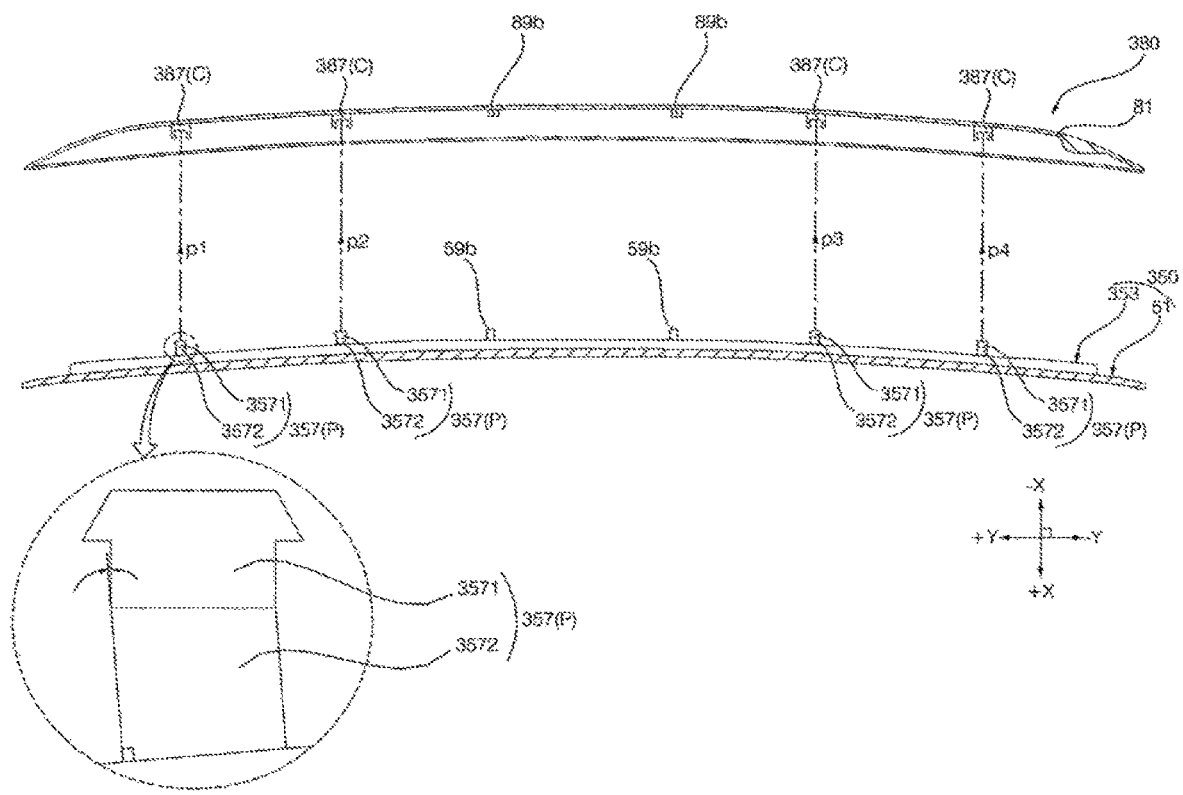
FIG. 9 is a bottom elevation view illustrating a coupling structure of a middle module 350 and a back module 380 according to a third embodiment.

Hereinafter, a third embodiment will be described with reference to FIG. 9. The rear surface of the middle module 350 forms a curvature without the parallel portion. The rear surface of the middle module 350 is extended along the curve direction and has a curved shape as a whole. The plurality of coupling portions 357 are a plurality of protrusion portions P.

The plurality of protrusion portions 357(P) includes a plurality of starting ends 3571 that are fixed to the rear surface of the middle module 50. The plurality of protrusion portions 357(P) include the starting ends 3571 respectively.

The plurality of protrusion portions 357(P) include a plurality of finishing ends 3572 extended in parallel with the rear side from the plurality of starting ends 3571. The plurality of protrusion portions 357(P) include the finishing ends 3572 respectively.

The plurality of starting ends 3571 may protrude perpendicularly to the coupled surface among the rear surface of the middle module 350, respectively. The plurality of starting ends 3571 may not be parallel to each other. The plurality of starting ends 3571 may be disposed radially. The directions in which the plurality of portions in which the plurality of starting ends 3571 are disposed respectively, among the rear surface of the middle module 350, face vary according to the curvature of the rear surface of the middle module 350. The plurality of starting ends 3571 respectively protruded perpendicularly to the plurality of portions in which the plurality of starting ends 3571 are disposed respectively, among the rear surface of the middle module 350, are not parallel to each other. As another example, at least some of the plurality of starting ends 3571 may protrude not to be perpendicular to the coupled surface among the rear surface of the middle module 350 respectively. The starting ends 3571 may constitute at least a portion of a support portion P110, P210 described later.

The plurality of finishing ends 3572 are extended and protruded from the plurality of starting ends 3571, respectively. The plurality of finishing ends 3572 are provided in parallel with each other. The plurality of finishing ends 3572 may protrude in the X-axis direction. The plurality of finishing ends 3572 protrude in the rearward direction. At least a portion of the support portion P110, P210 described later may be formed in the finishing ends 3572. An insertion portion P120, P220 described later may be formed in the finishing ends 3572.

The plurality of protrusion portions 357(P) may protrude from the reinforcement portion 353. The plurality of starting ends 3571 may protrude from the reinforcement portion 353.

Meanwhile, referring to FIGS. 2 to 4 and 6 to 9, the middle module 50 may further include a reinforcement portion 53 fixed to the middle cover 51. The reinforcement portion 53 reinforces the rigidity of the middle cover 51. The reinforcement portion 53 provides rigidity to maintain the curvature of the middle module 50. The reinforcement portion 53 reinforces the curvature of the display module 10 and the middle cover 51. The reinforcement portion 53 may support the middle cover 51.

The reinforcement portion 53 may be disposed to protrude to the rear side than the rear surface of the middle cover 51. The rear surface of the reinforcement portion 53 may be disposed in a rear side than the rear surface of the middle cover 51. The reinforcement portion 53 forms a thickness in the X-axis direction. The thickness of the reinforcement portion 53 in the X axis direction is larger than the thickness of the middle cover 51 in the X axis direction.

The reinforcement portion 53 is coupled to the rear side of the middle cover 51. The reinforcement portion 53 has a shape curved to couple to the rear side of the middle cover 51. The reinforcement portion 53 has a shape curved in the front-rear direction. The reinforcement portion 53 forms a curvature corresponding to the curvature of the middle cover 51. The front surface of the reinforcement portion 53 may form a curvature recessed to the rear side. The rear surface of the reinforcement portion 53 may form a curvature protruded to the rear side. The reinforcement portion 53 has a shape curved in the XY cross section. The reinforcement portion 53 is extended along the direction in which the middle cover 51 is curved. The reinforcement portion 53 is extended along the curve direction. The reinforcement portion 53 forms a curvature in the Y-axis direction. The reinforcement portion 53 is extended in the Y-axis direction when viewed from the rear side. It may be disposed to cross the central portion of the middle cover 51 in the Y-axis direction.

The reinforcement portion 53 forms the rear surface 531. The rear surface 531 faces the back module 80 in the front-rear direction. The rear surface 531 is extended in the Y-axis direction when viewed from the rear side. The reinforcement portion 53 may be formed in a ⊏-shape in the XZ cross section.

The reinforcement portion 53 may include a reinforcing rib 532, 533 to reinforce the rigidity of the rear surface 531. The reinforcing rib 532, 533 may be disposed perpendicular to the rear surface 531. A pair of reinforcing ribs 532 and 533 may be disposed in both ends of the Z-axis direction of the rear surface 531, respectively. A first reinforcing rib 532 is connected to the upper side end of the rear surface 531. A second reinforcing rib 533 is connected to the lower side end of the rear surface 531. The reinforcing rib 532, 533 protrudes forward from the rear surface 531 and is extended along the curve direction. The reinforcing rib 532, 533 may be formed in a plate shape to form a thickness in the Z-axis direction. A pair of reinforcing ribs 532, 533 are spaced apart from each other in the Z-axis direction.

The plurality of coupling portions 57 may be disposed in the reinforcement portion 53. The plurality of coupling portions 57 may be disposed in the rear surface 531 of the reinforcement portion 53. By disposing the coupling portion 57 in a portion having a relatively strong rigid, the coupling of the middle module 50 and the back module 80 can be stably achieved, and the reinforcement portion 53 can reinforce not only the rigidity of the middle module 50 but also the rigidity of the back module 80.

The plurality of coupling portions 57 are disposed along the extending direction of the reinforcement portion 53. The plurality of coupling portions 57 are spaced apart from each other along the extending direction of the reinforcement portion 53. The plurality of coupling portions 57 are disposed along the rear surface of the reinforcement portion 53. The reinforcement portion 53 is curved and extended along the curve direction, and the arrangement line (virtual line) of the plurality of coupling portions 57 are curved and extended along the curve direction.

The middle module 50 may be formed symmetrically in the left-right direction (Y-axis direction). The reinforcement portion 53 may be symmetrically formed in the Y-axis direction. The plurality of coupling portions 57 may be symmetrically disposed in the Y-axis direction. The plurality of coupling counterpart portions 87 may be symmetrically disposed in the Y-axis direction.

The coupling portion 57 may be a protrusion portion P, and may be a locking portion C. In the first embodiment, a plurality of locking portions C are disposed in the reinforcement portion 153. In the second and third embodiments, a plurality of protrusion portions P are disposed in the reinforcement portion 253, 353. In FIG. 8, among the rear surface 531 of the reinforcement portion 153, 253, the area in which the protrusion portion 257(P) or the coupling portion 157(C) is disposed is shown by a dotted line.

Referring to the first and second embodiments, the rear surface 531 of the reinforcement portion 53 may include a stepped portion in the front-rear direction. The rear surface 531 of the reinforcement portion 53 includes the plurality of parallel portions 153b and 253b. The rear surface 531 is stepped in the front-rear direction in at least one of both ends of the Y-axis direction of the parallel portion 153b, 253b. The rear surface 531 includes the extension portion 153a, 253a. The rear surface 531 may include a portion (extension portion 153a, 253a) extended along the direction in which the middle cover 51 is curved and a portion perpendicular to the front and rear directions (parallel portion 153b, 253b).

Referring to the third embodiment, the rear surface 531 may be curved in the front and rear direction as a whole. The rear surface 531 may be extended along the direction in which the middle cover 51 is curved. The rear surface 531 may be extended along the curve direction. The rear surface 531 may form curvature as a whole in the Y-axis direction.

Any one of the middle module 50 and the back module 80 includes a plurality of protrusion portions P which are disposed spaced apart from each other along the direction in which the any one of the middle module 50 and the back module 80 is curved (the curve direction) and are protruded in parallel with each other. The other of the middle module 50 and the back module 80 includes a plurality of locking portions C in which the plurality of protrusion portions P are locked respectively. The locking portion C and the protrusion portion P are coupled to each other. The plurality of locking portions C correspond to the plurality of protrusion portions P respectively. The protrusion portion P protrudes in the X-axis direction (front and rear direction). The locking portion C is recessed in the X-axis direction.

In the first embodiment (see FIG. 6), the parallel portion 153b forms a plane perpendicular to the X axis. The middle module 150 is provided with a plurality of locking portions 157(C) recessed in a direction perpendicular to the parallel portion 153b. The plurality of locking portions 157(C) are formed to be recessed in the +X axis direction. The back module 180 is formed with a plurality of protrusion portions 187(P) protruded in a direction perpendicular to the parallel portion 153b. The plurality of protrusion portions 187(P) are protruded in the +X axis direction.

In the second embodiment (see FIG. 7), the parallel portion 253b forms a plane perpendicular to the X axis. The middle module 250 is provided with a plurality of protrusion portions 257(P) protruded in a direction perpendicular to the parallel portion 253b. The plurality of protrusion portions 257(P) are formed to protrude in the −X axis direction. The back module 280 is provided with a plurality of locking portions 287(C) recessed in a direction perpendicular to the parallel portion 253b. The plurality of locking portions 287(C) are recessed in the −X axis direction.

In the third embodiment (see FIG. 9), the rear surface 531 of the reinforcement portion 53 is formed to have a curvature as a whole. The middle module 350 includes a plurality of starting ends 3571 protruded in a direction perpendicular to the rear surface 531, and finishing end 3572 protruded in the −X axis direction from the starting end 3357. The protrusion portion 357(P) includes the starting end 3571 and the finishing end 3572. The plurality of finishing ends 3572 are protruded in the −X axis direction. The plurality of locking portions 387(C) are recessed in the −X axis direction.

P1, p2, p3, and p4 shown in FIGS. 6, 7, and 9 indicates a direction (hereinafter, 'protrusion direction') in which each of the protrusion portions P is inserted into each of the locking portions C. The directions in which the plurality of protrusion portions P are inserted into the plurality of locking portions C are provided in parallel with each other. Through this, during the coupling process of the middle module 50 and the back module 80, the back module 80 may be coupled to the middle module 50 by parallel moving the back module 80 in the +X axis direction.

Hereinafter, referring to FIGS. 10A to 10C and 12A to 12C, the protrusion portion P100 according to an embodiment and the protrusion portion P200 according to another embodiment will be described in detail.

The plurality of protrusion portions P100 and P200 are protruded along the front and rear directions. The plurality of protrusion portions P100 and P200 may protrude rearward from the middle module 50 as in the second and third embodiments, and protrude forward from the back module 80 as in the first embodiment.

Each of the plurality of protrusion portions P100 and P200 includes an insertion portion P120, P220 which is inserted into each of corresponding plurality of locking portions C. The protrusion portion P100, P200 includes a support portion P110, P210 that support the insertion portion P120, P220. The support portion P110, P210 may be fixed to the middle module 50 as in the second and third embodiments, or may be fixed to the back module 80 as in the first embodiment.

In the present embodiment, the support portion P110, P210 is fixed to the reinforcement portion 53. One end of the support portion P110, P210 is fixed to the reinforcement portion 53, and the other ends of the support portion P110, P210 is fixed to the insertion portion P120, P220. The reinforcement portion 53 is provided with a hole 53h penetrated in the front-rear direction. The hole 53h is formed in the rear surface 531 of the reinforcement portion 53. The support portion P110, P210 may be fixed to a part of a portion that partitions the edge of the hole 53*h*.

The insertion portion P120, P220 includes a hook portion P121, P221 that allows the protrusion portion P100, P200 to be caught while being inserted into the locking portion C. The hook portion P121, P221 protrudes in a direction crossing the protrusion directions of the protrusion portion P100, P200. The hook portion P121, P221 may protrude in a direction perpendicular to the X-axis direction. Hereinafter, the hook portion P121, P221 will be described as protruding in the Y-axis direction, but is not necessarily limited thereto.

The hook portion P121, P221 may protrude in any one direction of both sides, or a pair of hook portions (P121*a*, P121*b*) (P221*a*, P221*b*) may be protruded in both directions, respectively. In the present embodiment, it is described that a pair of hook portions (P121*a*, P121*b*)(P221*a*, P221*b*) are provided, but the present invention is not necessarily limited thereto. The pair of hook portions P121 and P221 include a first hook portion P121*a*, P221*a* protruded to one side and a second hook portion P121*b*, P221*b* protruded to the other side. In the present embodiment, the first hook portion P121*a*, P221*a* is protruded in the +Y-axis direction, and the second hook portion P121*b*, P221*b* is protruded in the −Y-axis direction.

The insertion portion P120, P220 forms a distal end portion P123, P223. The distal end portion P123, P223 is a portion that is most deeply inserted into the locking portion C of the insertion portion P120, P220. The distal end portion P123, P223 forms a free end. The distal end portion P123, P223 forms a distal end in the X-axis direction. The distal end portion P123, P223 is disposed in a direction facing the locking portion C. The support portion P110, P210, the hook portion P121, P221, and the distal end portion P123, P223 are sequentially connected along the X-axis direction.

Figure 10A:
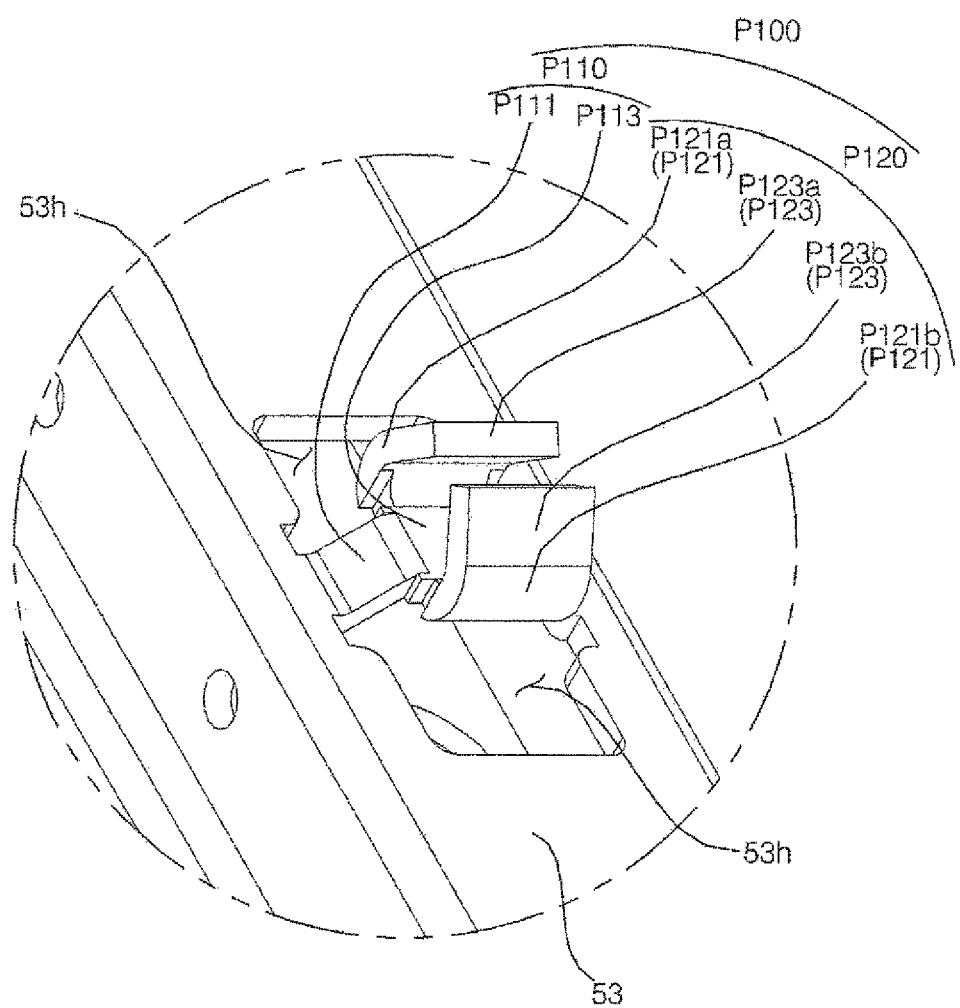
FIGS. 10A to 10C show an embodiment P100 of a protrusion portion P of FIGS. 6 to 9.
Figure 10B:
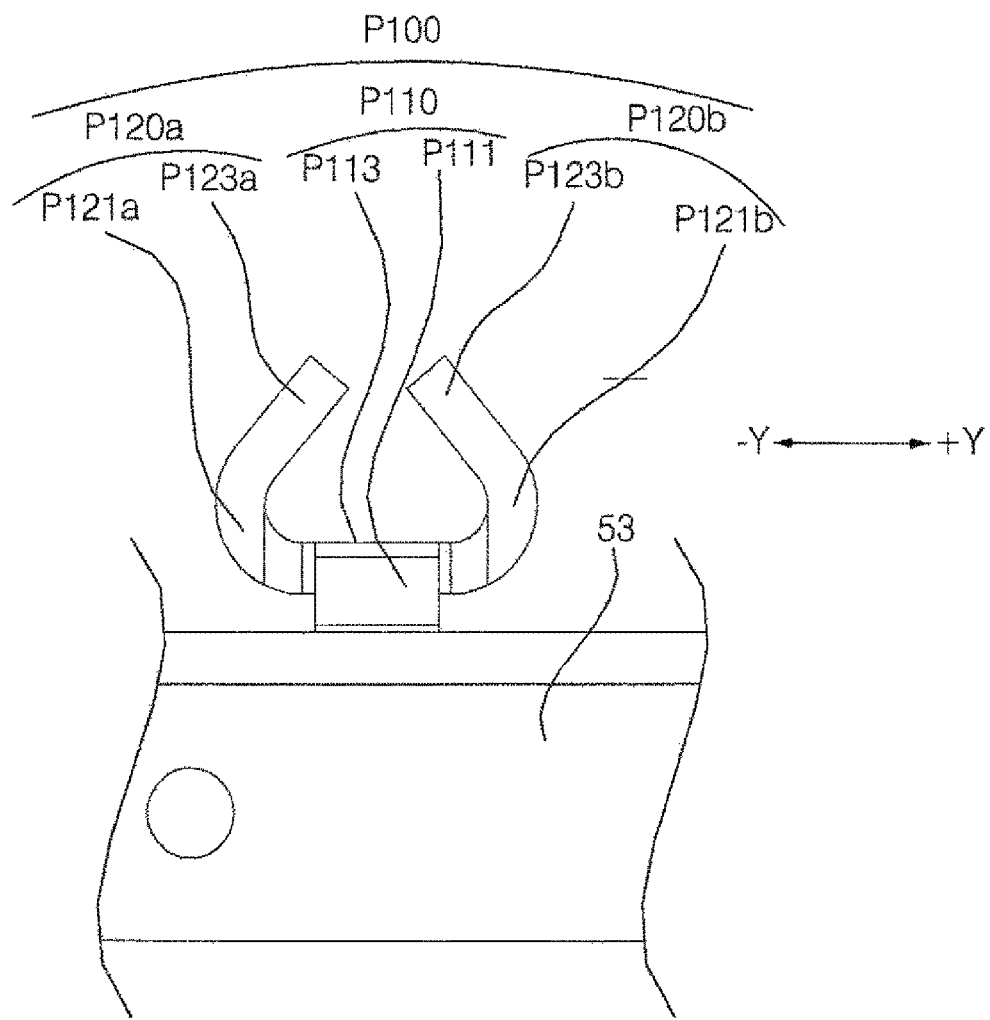
Figure 10C:
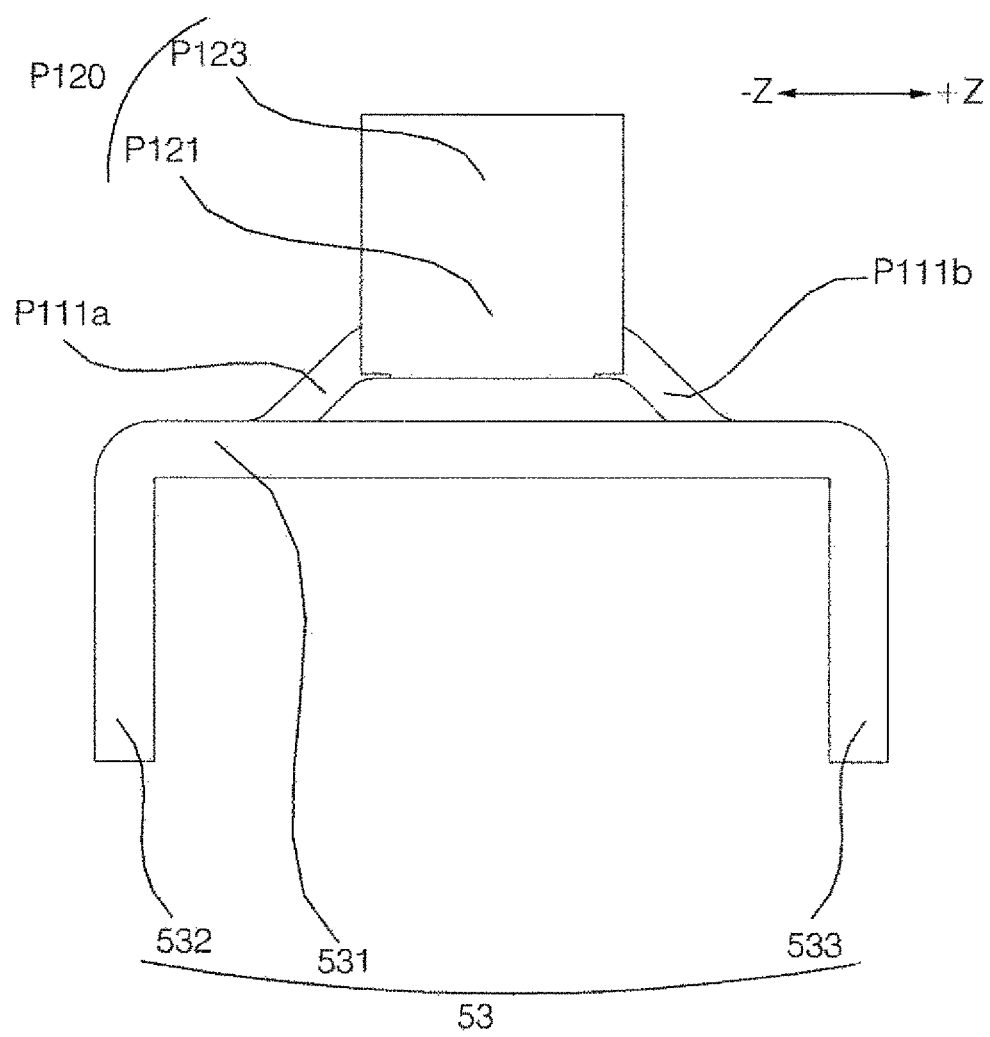

Hereinafter, referring to FIGS. 10A to 10C, the protrusion portion P100 according to an embodiment will be further described as follows.

The support portion P110 is fixed to both side ends of a hole 53*h*. The support portion P110 has a bridge shape that is convex in the protrusion direction.

The support portion P110 includes a base portion P111 fixed to the middle module 50 or the back module 80. In the present embodiment, the base portion P111 is fixed to the reinforcement portion 53. The base portion P111 includes a first base portion P111*a* fixed to one of both side ends of the hole 53*h* and a second base portion P111*b* fixed to the other. The base portion P111 is extended in an oblique direction in the X axis direction. The first base portion P111*a* and the second base portion P111*b* are formed symmetrically based on the X axis.

The support portion P110 includes a connection portion P113 connecting between the base portion P111 and the insertion portion P120. One end of the base portion P111 is fixed to the reinforcement portion 53 and the other end is fixed to the connection portion P113. The connection portion P113 is extended while connecting between the first basic portion P111*a* and the second basic portion P111*b*. The connection portion P113 has a plate shape which forms thickness in the X-axis direction. A portion to which the insertion portion P120 is connected and a portion to which the base portion P111 is connected may be disposed perpendicularly to each other among the edge side ends of the connection portion P113. In the present embodiment, the insertion portion P120 is connected to both ends of the Y-axis direction of the connection portion P113, and the base portion P111 is connected to both ends of the Z-axis direction of the connection portion P113.

The insertion portion P120 includes a first insertion portion P120*a* connected to one of both ends of the Y-axis direction of the connection portion P113 and a second insertion portion P120*b* connected to the other. The first insertion portion P120*a* and the second insertion portion P120*b* are formed symmetrically based on the X axis.

The insertion portion P120 is formed in a curved plate shape. The insertion portion P120 has a curved shape to be rounded. The first insertion portion P120*a* includes a first hook portion P121*a*, and the second insertion portion P120*b* includes a second hook portion P121*b*. The first insertion portion P120*a* includes a first distal end portion P123*a*, and the second insertion portion P120*b* includes a second distal end portion P123*b*.

Figure 15:
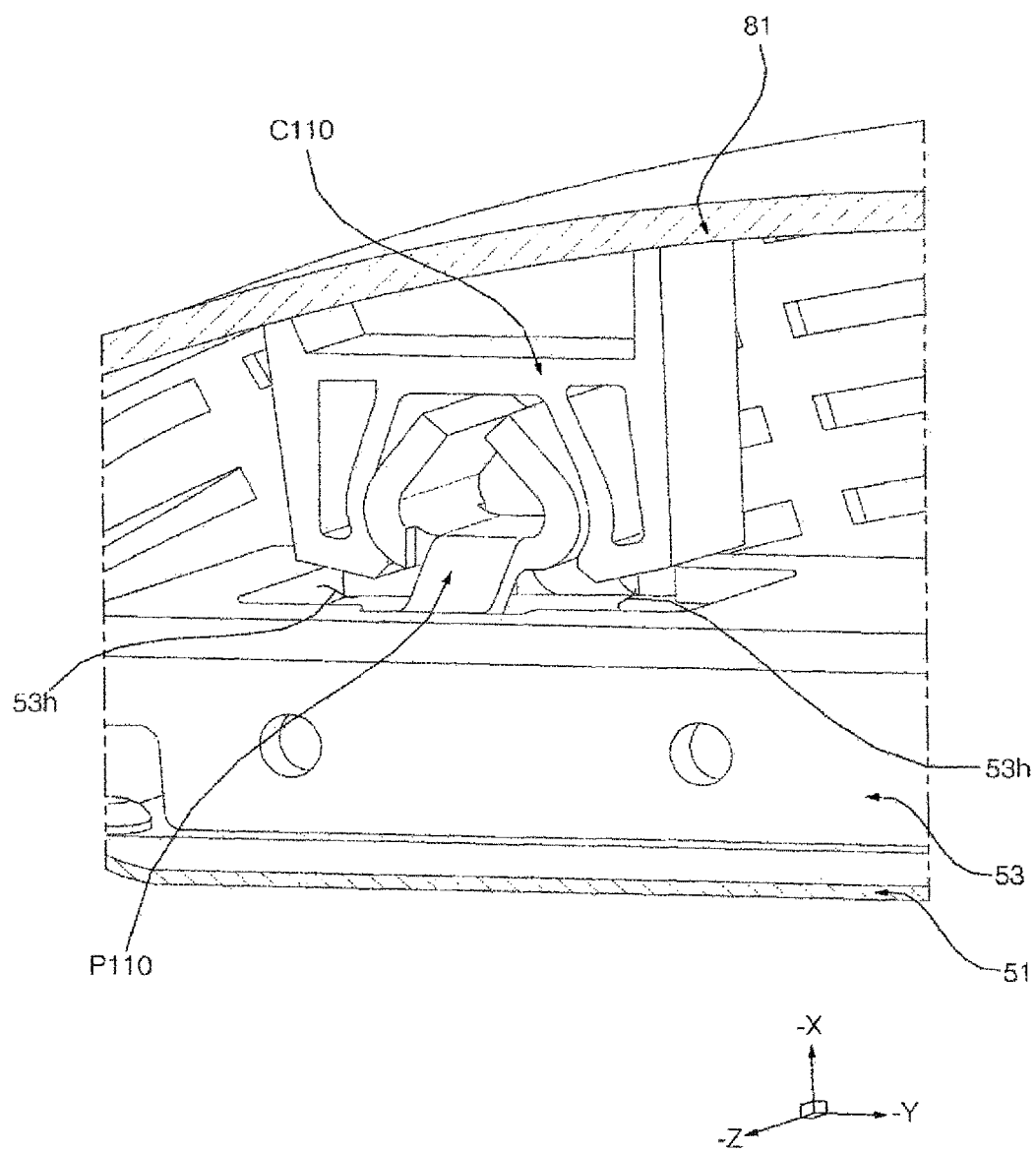
FIG. 15 is a perspective view illustrating a state in which the protrusion portion P and the locking portion C of FIGS. 6 to 9 are coupled to each other, and as an example, shows a coupling relationship between the protrusion portion P100 and the locking portion C100.

The first distal end portion P123*a* and the second distal end portion P123*b* are spaced apart from each other. The first distal end portion P123*a* and the second distal end portion P123*b* form a gap in the Y-axis direction. The gap between the first distal end portion P123*a* and the second distal end portion P123*b* is narrowed while the protrusion portion P100 is inserted into the locking portion C. When the protrusion portion P100 is completely inserted into the locking portion C (see FIG. 15), the gap between the first distal end portion P123*a* and the second distal end portion P123*b* is restored again, and a coupling force between the protrusion portion P100 and the locking portion C may be secured.

Figure 11:
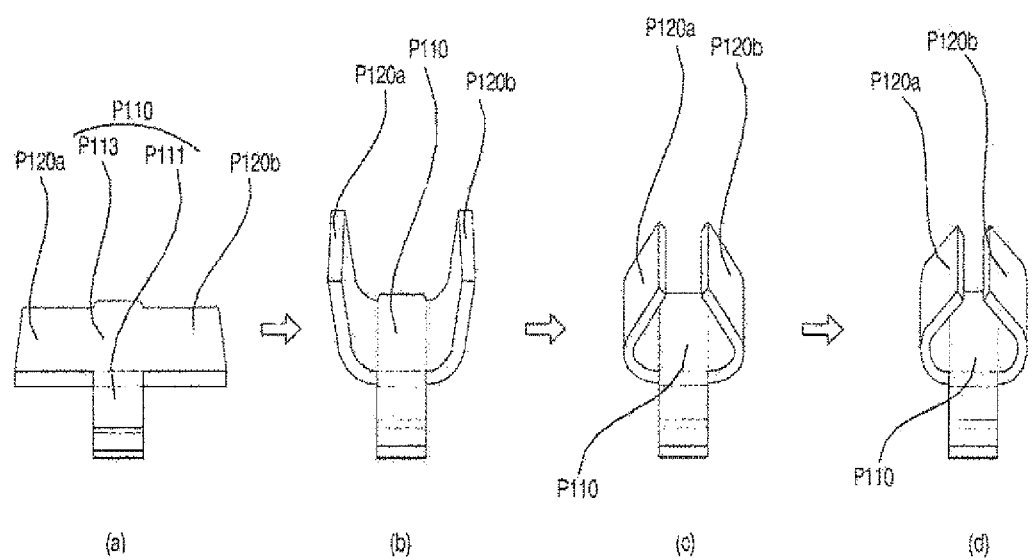
FIG. 11 is a view illustrating a manufacturing process of the protrusion portion P100 of FIGS. 10A to 10C.

FIG. 11 illustrates a process of manufacturing the protrusion portion P100 by using a plate metal. First, referring to FIG. 11A, in a state where the connection portion P113, the first insertion portion P120*a*, and the second insertion portion P120*b* are flat plates, the first base portion P111*a* and the second base portion P111*b* are curved with respect to the connection portion P113. Thereafter, referring to FIG. 11B, the first insertion portion P120*a* and the second insertion portion P120*b* are curved with respect to the support portion P110. Thereafter, referring to FIG. 11C, the insertion portion P120 is bent to form a hook portion P121. Thereafter, referring to FIG. 11D, the insertion portion P120 is finally bent to adjust a gap between the first distal end portion P123*a* and the second distal end portion P123*b*.

Figure 12A:
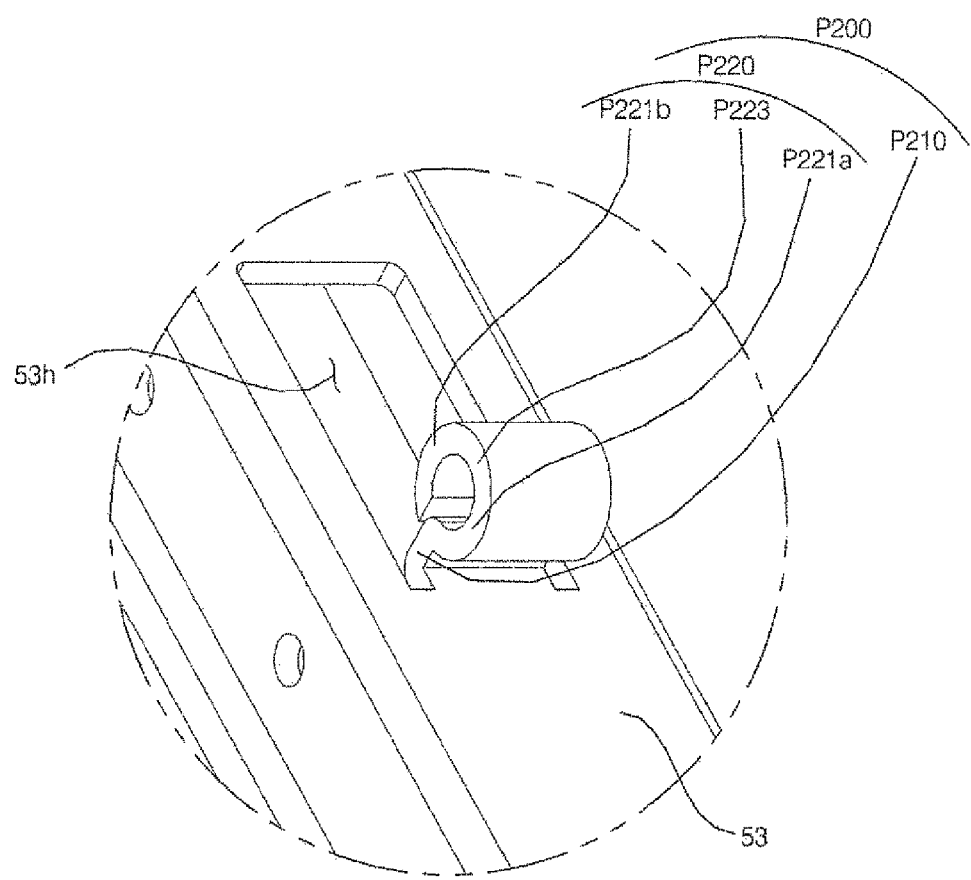
FIGS. 12A to 12C show another embodiment P200 of the protrusion portion P of FIGS. 6 to 9.
Figure 12B:
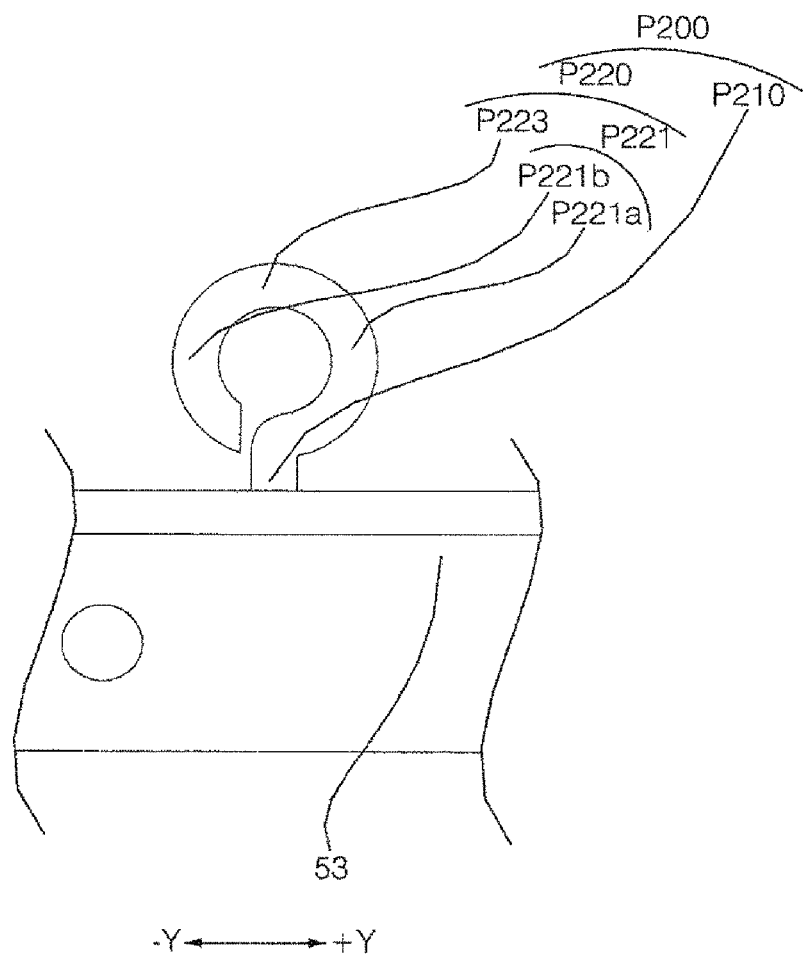
Figure 12C:
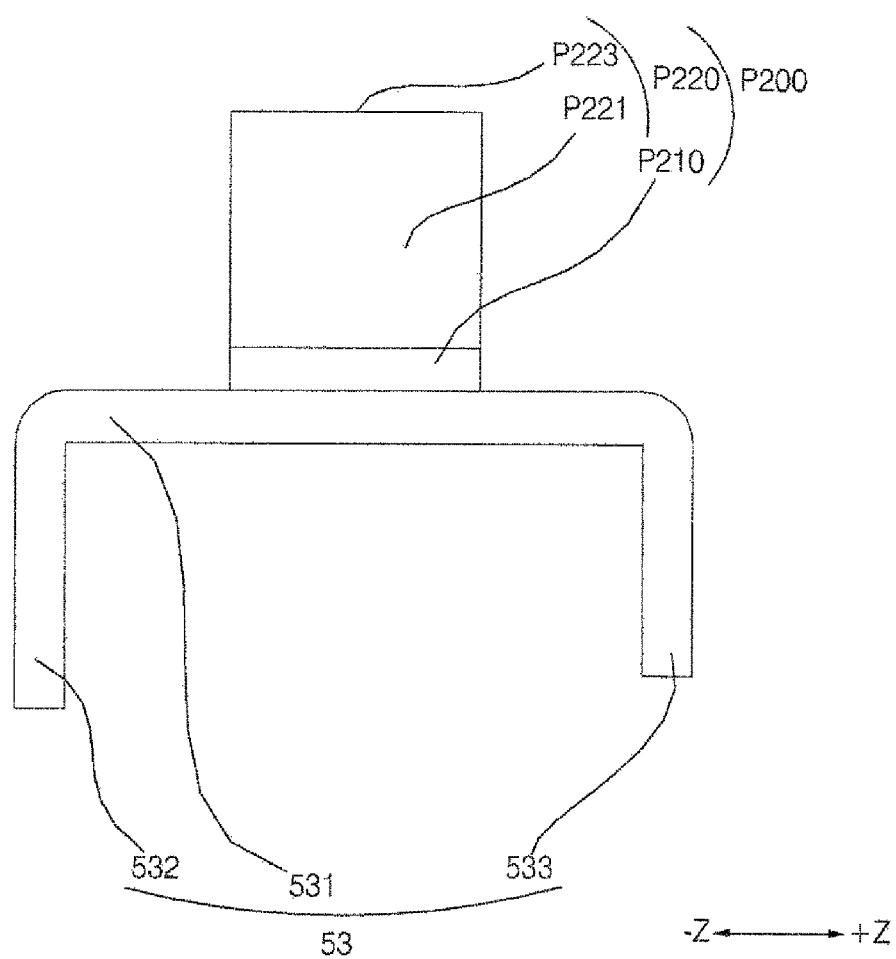

Hereinafter, referring to FIGS. 12A to 12C, the protrusion portion P200 according to another embodiment will be further described.

The support portion P210 is fixed to one end of the hole 53*h*. The support portion P210 is connected to one side of both ends of the Y-axis direction of the hole 53*h*. The support portion P210 has a plate shape extended in the X-axis direction. In the present embodiment, the support portion P210 is formed in a plate shape having a thickness in the Y-axis direction. One end of the support portion P210 is fixed to the reinforcement portion 53 and the other end is fixed to the insertion portion P220.

The insertion portion P220 is formed in a curved plate shape. The insertion portion P220 is curved to be rounded and is extended by starting from one end of the support portion P210. In the present embodiment, the insertion portion P220 is curved and extended along the circumference of the Z axis. The first hook portion P221*a*, the distal end portion P223, and the second hook portion P221*b* are sequentially formed along the extending direction of the insertion portion P220. The distal end portion P223 is extended while connecting the first hook portion P221*a* and the second hook portion P221*b*.

One end of the second hook portion P221*b* is connected to the distal end portion P223 and the other end forms a free end. The other end of the second hook portion P221b is disposed to be spaced apart from the support portion P210. The other end of the second hook portion P221b and the support portion P210 form a gap in the Y-axis direction. In a process where the protrusion portion P200 is inserted into the locking portion C, when the gap between the second end portion P223b and the support portion P210 is narrowed, and when the protrusion portion P200 is completely inserted into the locking portion C, the gap between the distal end portion P223b and the support portion P210 is restored again, and a coupling force between the protrusion portion P200 and the locking portion C is secured.

Hereinafter, referring to FIGS. 13A to 14, the locking portion C100 according to an embodiment and the locking portion C200 according to another embodiment will be described in detail.

The plurality of locking portions C100 and C200 form a recessed groove along the front and rear direction. The plurality of locking portions C100 and C200 may form a groove recessed forward in the middle module 50 as in the first embodiment, and may form a groove recessed rearward in the back module 80 as in the second and third embodiments.

Each of the plurality of locking portions C100 and C200 includes an accommodation portion C100h, C200h recessed as a shape that engages with a corresponding insertion portion P120 and P220. The accommodation portion C100h, C200h is recessed in directions parallel to each other.

The locking portion C100, C200 includes a bottom surface forming portion C130, C230 that forms the bottom surface of the accommodation portion C100h, C200h. The bottom surface forming portion C130, C230 may form a surface perpendicular to the X-axis direction. The bottom surface forming portion C130, C230 may be disposed in the innermost side of the accommodation portion C100h, C200h. In the state where the protrusion portion P and the locking portion C100, C200 are coupled, the bottom surface forming portion C130, C230 may contact the distal end portion P123, P223 of the protrusion portion P.

The locking portion C100, C200 includes a side forming portion C120, C220 which forms a side surface of the accommodation portion C100h, C200h. In the present embodiment, the side forming portion C120, C220 forms both side surfaces of the Y-axis direction of the accommodation portion C100h, C200h. A first side forming portion C120a, C220a forms a side surface of the +Y-axis direction of the accommodation portion C100h, C200h. A second side forming portion C120b, C220b forms a side surface of the −Y axis direction of the accommodation portion C100h, C200h. In the state where the protrusion portion P and the locking portion C100, C200 are coupled, the first hook portion P121a, P221a of the protrusion portion P contacts the first side forming portion C120a, C220a, and the second hook portion P121b, P221b of the protrusion portion P contacts the second side forming portion C120b, C220b.

The locking portion C100, C200 includes a hook locking portion C110, C210 to which the hook portion P121, P221 is locked and seated. In the state where the protrusion portion P and the locking portion C100, C200 are coupled, the hook locking portion C110, C210 prevent the hook portion P121, P221 from escaping. In the state where the protrusion portion P and the locking portion C100, C200 are coupled, the hook locking portion C110, C210 is disposed in the opposite direction to the protrusion direction than the hook portion P121, P221. The hook locking portion C110, C210 includes a first hook locking portion C110a, C210a for locking the first hook portion P221a and a second hook locking portion C110b, C210b for locking the second hook portion P221b.

Figure 13A:
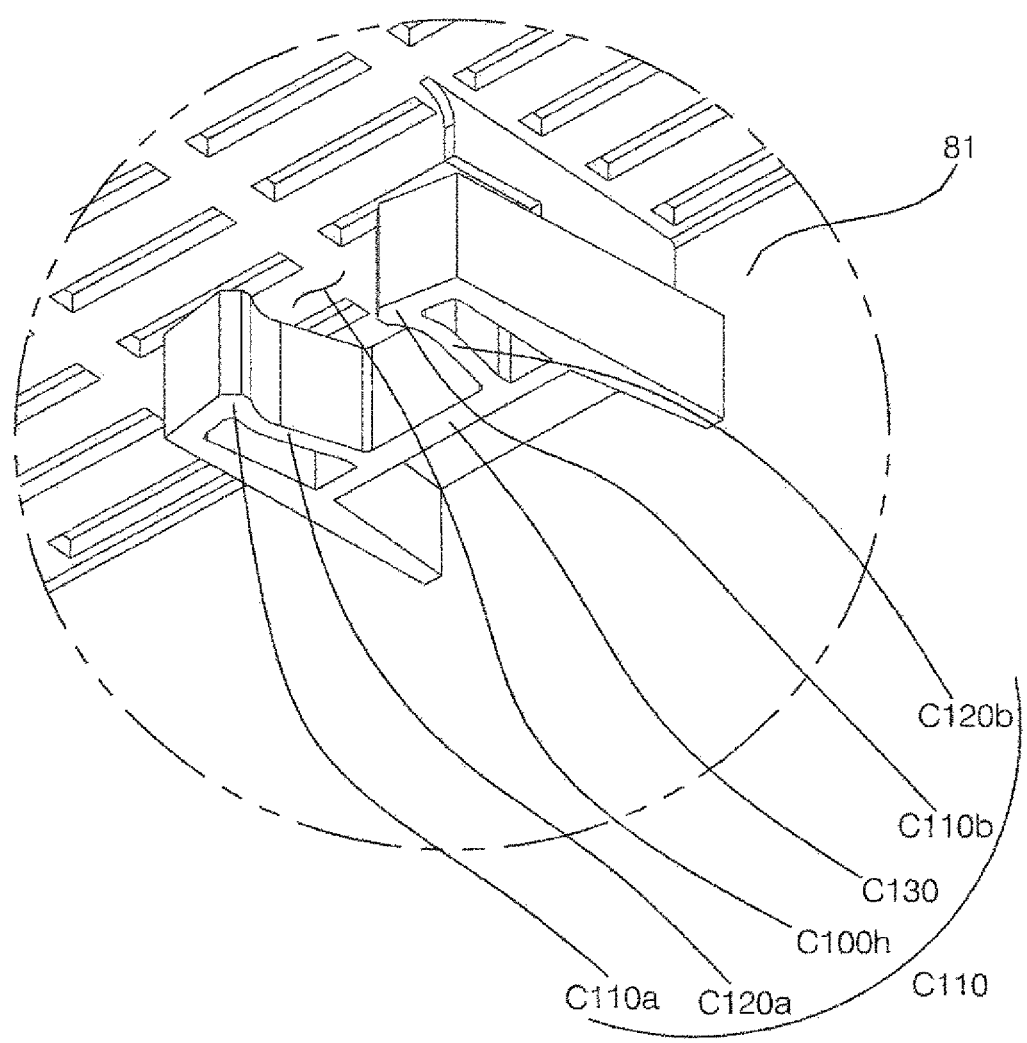
FIGS. 13A and 13B show an embodiment C100 of a locking portion C of FIGS. 6 to 9.
Figure 13B:
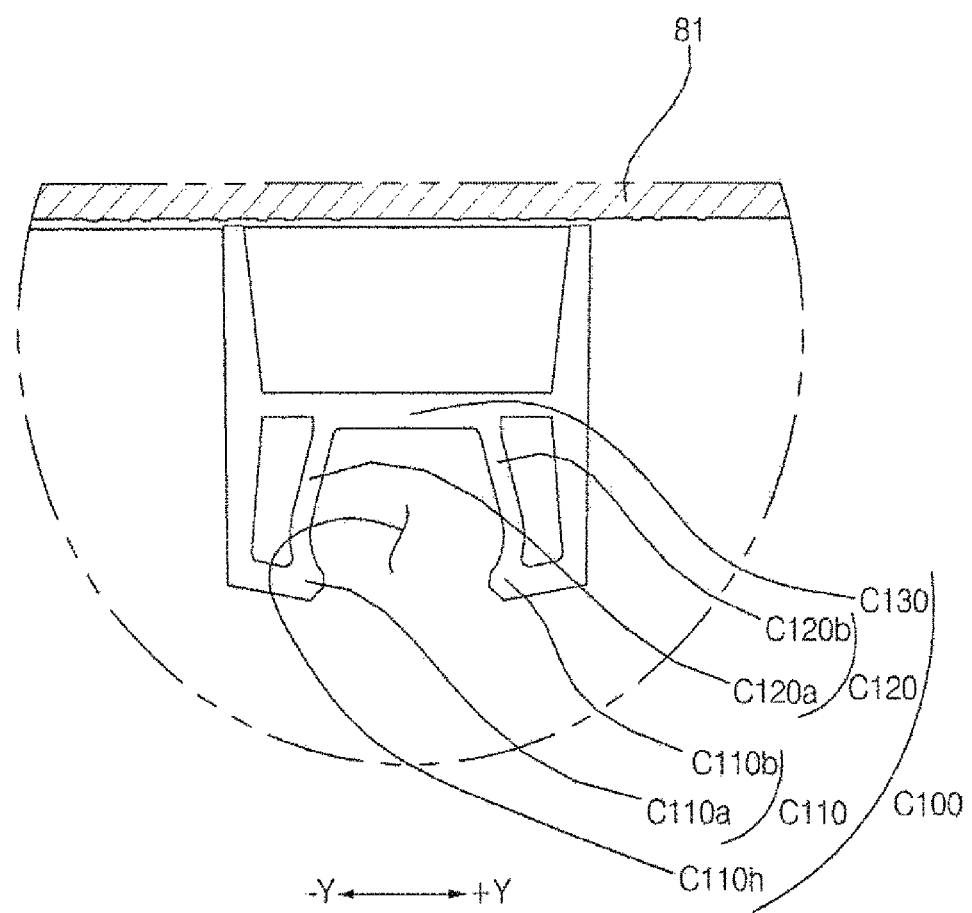

Referring to FIGS. 13A and 13B, the locking portion C100 according to an embodiment may be integrally formed with the middle module 50 or the back module 80. In the present embodiment, the locking portion C100 is formed to protrude from the back cover 81. The locking portion C100 may be integrally injected with the back cover 81.

Figure 14:
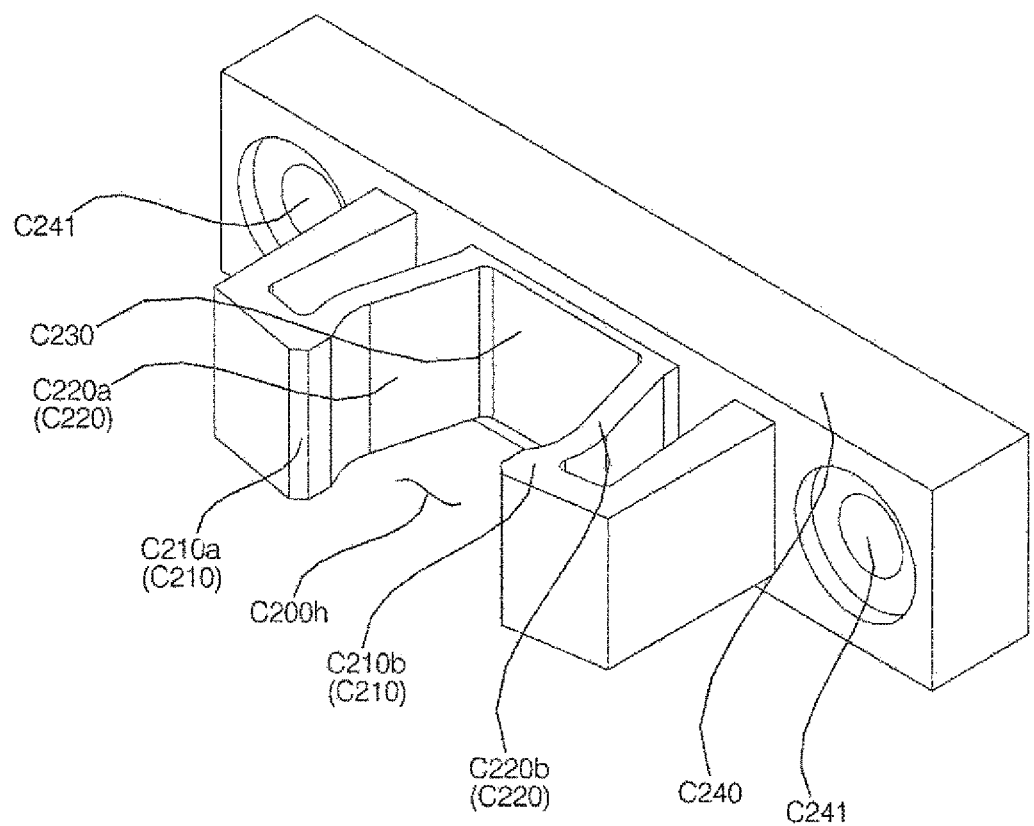
FIG. 14 is a perspective view showing another embodiment C200 of the locking portion C of FIGS. 6 to 9.

Referring to FIG. 14, the locking portion C200 according to another embodiment is a separate component that is fastened to the back cover 81. The locking portion C200 may be separately manufactured by injection, and may be fixed to the back cover 81 by a fastening member such as a screw. The locking portion C200 includes a cover coupling portion C240 coupled to the back cover 81. The cover coupling portion C240 is disposed in the protrusion direction side than the accommodation portion C100h, C200h. The cover coupling portion C240 may have a fastening hole C241 through which a screw penetrates. A fastening member such as a screw may pass through the fastening hole C241 and be fixed to the back cover 81.

Figure 16:
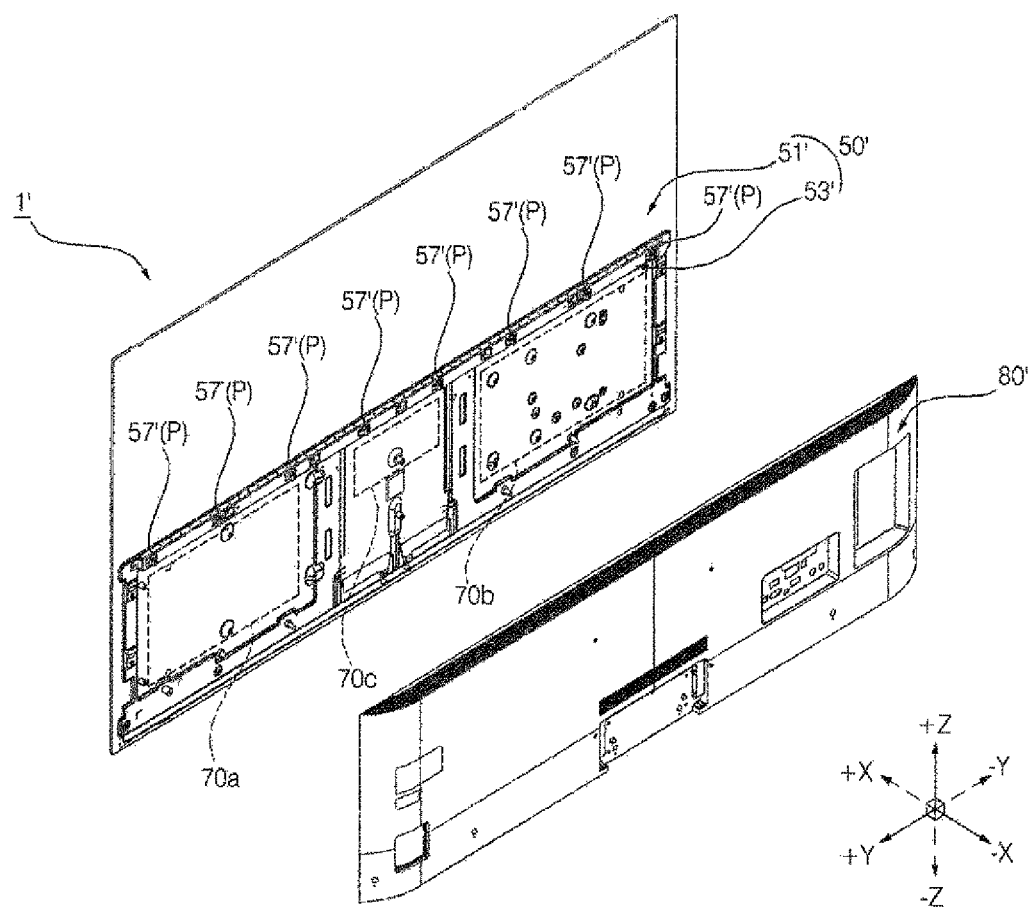
FIG. 16 is an exploded perspective view of a flat panel display apparatus 1' according to another embodiment of the present invention.

Referring to FIG. 16, a display apparatus 1' according to another embodiment is formed in a flat shape unlike the display apparatus 1 according to the embodiment. Specifically, the display module of the display apparatus 1' is formed in a flat shape. A middle module 50' and a back module 80' of the display apparatus 1' are formed in a flat shape. A middle cover 51' and a reinforcement portion 53' of the middle module 50' are formed in a flat shape. The coupling portion 57 is disposed in middle module 50', and the coupling counterpart portion 87 is disposed in back module 80'. One of the coupling portion 57 of the middle module 50' and the coupling counterpart portion 87 of the back module 80' is the protrusion portion P and the other is the locking portion C. The shapes of the protrusion portion P and the locking portion C applied to the display apparatus 1' are the same as those described above, and thus the description thereof is omitted.

DESCRIPTION OF THE CODE 1, 1': DISPLAY APPARATUS
10: DISPLAY MODULE
50, 150, 250, 350: MIDDLE MODULE
51: MIDDLE COVER
53, 153, 253, 353: REINFORCEMENT PORTION
57, 157, 257, 357: COUPLING PORTION
59: AUXILIARY COUPLING PORTION
70: CONTROL COMPONENT
80, 180, 280, 380: BACK MODULE
81: BACK COVER
87, 187, 287, 387: COUPLING COUNTERPART PORTION
89: AUXILIARY COUPLING COUNTERPART PORTION
P, P100, P200: PROTRUSION PORTION
P110, P210: SUPPORT PORTION
P120, P220: INSERTION PORTION
C, C100, C200: LOCKING PORTION
C100H, C200H: ACCOMMODATION PORTION
C110, C210: HOOK LOCKING PORTION

What is claimed is:
1. A display apparatus comprising:
a display module curved in a front-rear direction;
a middle module curved and coupled to a rear side of the display module;

a back module curved and covering at least a portion of a rear side of the middle module;

a reinforcement portion disposed between the middle module and the back module, and coupled to the rear side of the middle module, wherein the reinforcement portion is extended in a curved direction of the middle module and comprises a first end adjacent to a left side of the middle module and a second end adjacent to a right side of the middle module;

a plurality of protrusion portions protruded from one of the reinforcement portion or the back module to a remaining one of the reinforcement portion or the back module, wherein each of the plurality of protrusion portions are spaced apart from each other in a longitudinal direction of the reinforcement portion; and a plurality of locking portions provided at the remaining one of the reinforcement portion or the back module, and to which the plurality of protrusion portions are coupled respectively, wherein the plurality of protrusion portions or the plurality of locking portions are formed as one body with the reinforcement portion.

2. The display apparatus of claim 1, wherein the plurality of protrusion portions are protruded along the front-rear direction.

3. The display apparatus of claim 1, wherein each of the plurality of protrusion portions comprises an insertion portion inserted into each of corresponding plurality of locking portions, and each of the plurality of locking portions comprises an accommodation portion recessed in a shape that engages a corresponding insertion portion.

4. The display apparatus of claim 3, wherein the accommodation portion of the plurality of locking portions is recessed in a direction parallel to each other.

5. The display apparatus of claim 3, wherein the insertion portion comprises a hook portion protruded in a direction crossing a protrusion direction of a protrusion portion, and a locking portion comprises a hook locking portion to which the hook portion is locked and seated.

6. The display apparatus of claim 1,
wherein the plurality of protrusion portions comprise:
a plurality of starting ends fixed to a rear side of the reinforcement portion; and
a plurality of finishing ends extended in parallel with each other to a rear side from the plurality of starting ends.

7. The display apparatus of claim 1, wherein the middle module comprises:
a middle cover coupled to a rear side of the display module and the reinforcement portion.

8. The display apparatus of claim 7, wherein the plurality of protrusion portions and the plurality of locking portions are disposed along the longitudinal direction of the reinforcement portion.

9. The display apparatus of claim 7, wherein the plurality of protrusion portions or the plurality of locking portions are disposed on a rear side of the reinforcement portion,
wherein the rear side comprises a plurality of parallel portions in which the plurality of protrusion portions or the plurality of locking portions are disposed respectively and disposed in parallel with each other.

10. The display apparatus of claim 9, wherein the rear side is formed to be stepped in the front-rear direction in at least one end of a parallel portion.

11. The display apparatus of claim 1, wherein the plurality of protrusion portions are in aligned to be parallel with each other.

12. The display apparatus of claim 1, wherein the reinforcement portion comprises:
a rear side on which the plurality of protrusion portions or the plurality of locking portions are formed, and
a reinforcing rib which is protruded from the rear side in a direction crossing the rear side.

* * * * *